United States Patent
Guo et al.

(10) Patent No.: US 12,113,857 B2
(45) Date of Patent: Oct. 8, 2024

(54) BLOCKCHAIN-BASED DATA PROCESSING METHOD AND DEVICE AND READABLE STORAGE MEDIUM

(71) Applicant: Tencent Technology (Shenzhen) Company Limited, Guangdong (CN)

(72) Inventors: Rui Guo, Guangdong (CN); Hu Lan, Guangdong (CN); Zongyou Wang, Guangdong (CN); Yang Lu, Guangdong (CN); Jun Liang, Guangdong (CN); Chaojie Qi, Guangdong (CN); Yang Mo, Guangdong (CN); Yifang Shi, Guangdong (CN); Hui Zhang, Guangdong (CN); Zimin Chen, Guangdong (CN); Guihong Huang, Guangdong (CN); Zuodong Liang, Guangdong (CN); Bo Qin, Guangdong (CN); Lisen Li, Guangdong (CN);

(Continued)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/378,294

(22) Filed: Oct. 10, 2023

(65) Prior Publication Data

US 2024/0039992 A1 Feb. 1, 2024

Related U.S. Application Data

(63) Continuation of application No. PCT/CN2022/131397, filed on Nov. 11, 2022.

(30) Foreign Application Priority Data

Jan. 30, 2022 (CN) .......................... 202210114515.9

(51) Int. Cl.
*H04L 67/1095* (2022.01)
*H04L 41/22* (2022.01)

(52) U.S. Cl.
CPC .......... *H04L 67/1095* (2013.01); *H04L 41/22* (2013.01)

(58) Field of Classification Search
CPC ........................... H04L 67/1095; H04L 41/22
See application file for complete search history.

(56) References Cited

U.S. PATENT DOCUMENTS

| | | | | |
|---|---|---|---|---|
| 2020/0004788 A1* | 1/2020 | Qiu | .................... | G06F 16/9014 |
| 2021/0320926 A1* | 10/2021 | Shina | .................... | H04L 63/108 |
| 2021/0342899 A1* | 11/2021 | Shi | .................... | G06Q 30/0283 |

FOREIGN PATENT DOCUMENTS

| | | |
|---|---|---|
| CN | 111258725 A | 6/2020 |
| CN | 112417480 A | 2/2021 |

OTHER PUBLICATIONS

International Search Report issued Feb. 7, 2023 in International (PCT) Application No. PCT/CN2022/131397 with English translation (9 pages).

* cited by examiner

*Primary Examiner* — Phuoc H Nguyen
*Assistant Examiner* — Steven C Nguyen
(74) *Attorney, Agent, or Firm* — Crowell & Moring LLP

(57) ABSTRACT

A blockchain-based data processing method, device, and a computer-readable storage medium are provided. A first resource acquisition request of an object identification is transmitted for a target virtual resource to a blockchain network to make the blockchain network query a target ticket identification associated with the object identification and the target virtual resource based on the first resource acquisition request. Metadata is acquired having a binding relationship with the target ticket identification. The target (Continued)

ticket identification is used for characterizing that the object identification has ownership of the target virtual resource. The target virtual resource is acquired according to the metadata returned by the blockchain network. The target virtual resource is controlled to perform an interaction output in response to a triggering operation for interacting with the target virtual resource.

20 Claims, 14 Drawing Sheets

(72) Inventors: Yubin Song, Guangdong (CN); Yongjing Li, Guangdong (CN); Chao Wang, Guangdong (CN); Ming Liu, Guangdong (CN); Tao Fan, Guangdong (CN); Yongjia Xue, Guangdong (CN); Shitao Xu, Guangdong (CN); Shihao She, Guangdong (CN); Gengliang Zhu, Guangdong (CN); Zhigang Lu, Guangdong (CN)

BLOCKCHAIN-BASED DATA PROCESSING METHOD AND DEVICE AND READABLE STORAGE MEDIUM

RELATED APPLICATION

This application is a continuation of PCT application PCT/CN2022/131397 filed Nov. 11, 2022, which claims priority to Chinese Patent Application No. 202210114515.9, entitled "Blockchain-based data processing method and device and readable storage medium" filed with the China National Intellectual Property Administration on Jan. 30, 2022. All are incorporated by reference in their entireties.

FIELD OF THE TECHNOLOGY

The present subject matter relates to the technical field of the Internet, and particularly relates to a blockchain-based data processing method and device and a readable storage medium.

BACKGROUND OF THE DISCLOSURE

Blockchain technology may effectively guarantee the authenticity and security of on-chain data due to its characteristics of decentralization and non-tampering. Therefore, with the rapid development of network technology, the blockchain technology is more and more widely used.

In an existing use of blockchain to store data, an object (such as an enterprise and an individual using the blockchain) uplinks complete data through a computer device and subsequently acquires the complete data from the blockchain. Considering that the blockchain has a limited storage space and more and more objects are added to the blockchain, an occupied space (amount of data) of the uplinked data is usually small, e.g., only simple texts and low-resolution images are uplinked. Apparently, existing methods for storing data in the blockchain have a limitation on the type of data stored.

BRIEF SUMMARY

Examples of the present subject matter provide a blockchain-based data processing method and device and a readable storage medium, not only a storage space of the blockchain may be saved, but also the applicability of the blockchain to store data may be improved, and in addition, a display effect of a target virtual resource may also be improved.

An aspect of examples of the present subject matter provides a blockchain-based data processing method performed by a computer device, including:
transmitting a first resource acquisition request of an object identification for a target virtual resource to a blockchain network to make the blockchain network query a target ticket identification associated with the object identification and the target virtual resource based on the first resource acquisition request, and acquiring metadata having a binding relationship with the target ticket identification, the target ticket identification is used for characterizing that the object identification has ownership of the target virtual resource;
acquiring the target virtual resource according to the metadata returned by the blockchain network; and
controlling the target virtual resource to perform an interaction output in response to a triggering operation for interacting with the target virtual resource.

An aspect of examples of the present subject matter provides a blockchain-based data processing method performed by a computer device, including:
a terminal device displaying a target virtual resource in a digital asset application logged in through an object identification; the target virtual resource is obtained according to metadata returned by a blockchain network; the metadata is acquired by a terminal device transmitting a first resource acquisition request for the target virtual resource to the blockchain network through the object identification; the first resource acquisition request is used for indicating the blockchain network, querying a target ticket identification associated with the object identification and the target virtual resource, and acquiring the metadata having a binding relationship with the target ticket identification; and the target ticket identification is used for characterizing that the object identification has ownership of the target virtual resource; and
controlling the target virtual resource to perform an interaction output in response to a triggering operation for interacting with the target virtual resource.

An aspect of examples of the present subject matter provides a blockchain-based data processing apparatus, including:
a request transmitting module, configured to transmit a first resource acquisition request of an object identification for a target virtual resource to a blockchain network to make the blockchain network query a target ticket identification associated with the object identification and the target virtual resource based on the first resource acquisition request, and acquire metadata having a binding relationship with the target ticket identification, the target ticket identification is used for characterizing that the object identification has ownership of the target virtual resource;
a first acquisition module, configured to acquire the target virtual resource according to the metadata returned by the blockchain network; and
an interaction output module, configured to control the target virtual resource to perform an interaction output in response to a triggering operation for interacting with the target virtual resource.

An aspect of examples of the present subject matter provides a blockchain-based data processing apparatus, the blockchain-based data processing apparatus running on a terminal device, including:
a resource display module, configured to display a target virtual resource in a digital asset application logged in through an object identification, the target virtual resource is obtained according to metadata returned by a blockchain network; the metadata is acquired by a terminal device transmitting a first resource acquisition request for the target virtual resource to the blockchain network through the object identification; the first resource acquisition request is used for indicating the blockchain network, querying a target ticket identification associated with the object identification and the target virtual resource, and acquiring the metadata having a binding relationship with the target ticket identification; and the target ticket identification is used for characterizing that the object identification has ownership of the target virtual resource; and
an interaction output module, configured to control the target virtual resource to perform an interaction output in response to a triggering operation for interacting with the target virtual resource.

An aspect of the present subject matter provides a computer device, including: a processor, a memory, and a network interface, the processor is connected to the memory and the network interface; the network interface is configured to provide a data communication function, the memory is configured to store a computer program, and the processor is configured to call the computer program to cause the computer device to perform the method in examples of the present subject matter.

An aspect of examples of the present subject matter provides a non-transitory computer-readable storage medium having stored therein a computer program, the computer program is adapted to be loaded by a processor and to perform the method in examples of the present subject matter.

An aspect of examples of the present subject matter provides a computer program product or computer program including computer instructions, the computer instructions is stored in a non-transitory computer-readable storage medium. A processor of a computer device reads the computer instructions from the non-transitory computer-readable storage medium, and the processor executes the computer instructions to cause the computer device to perform the method in examples of the present subject matter.

It can be seen from the above that examples of the present subject matter may avoid storing the target virtual resource in the blockchain network by storing metadata corresponding to the target virtual resource and the target ticket identification in the blockchain network. Since an occupied space of the metadata is smaller than that of the target virtual resource, adopting examples of the present subject matter can not only save the storage space of the blockchain, but also improve the applicability of the blockchain to store data; therefore, when the target virtual resource has a large occupied space, the authenticity thereof may still be ensured through the blockchain network. Since the target virtual resource in examples of the present subject matter has both an asset property and an interaction property, by implementing an interaction operation with the target virtual resource, a presentation effect of the target virtual resource may be improved.

BRIEF DESCRIPTION OF THE DRAWINGS

To describe the technical solutions in the examples of the present subject matter or in the related art more clearly, the following briefly introduces the accompanying drawings required by the examples or the related art. Apparently, the accompanying drawings in the following description show merely some examples of the present subject matter, and a person skilled in the art may also obtain other accompanying drawings according to these accompanying drawings without creative efforts.

DETAILED DESCRIPTION

Figure 1:
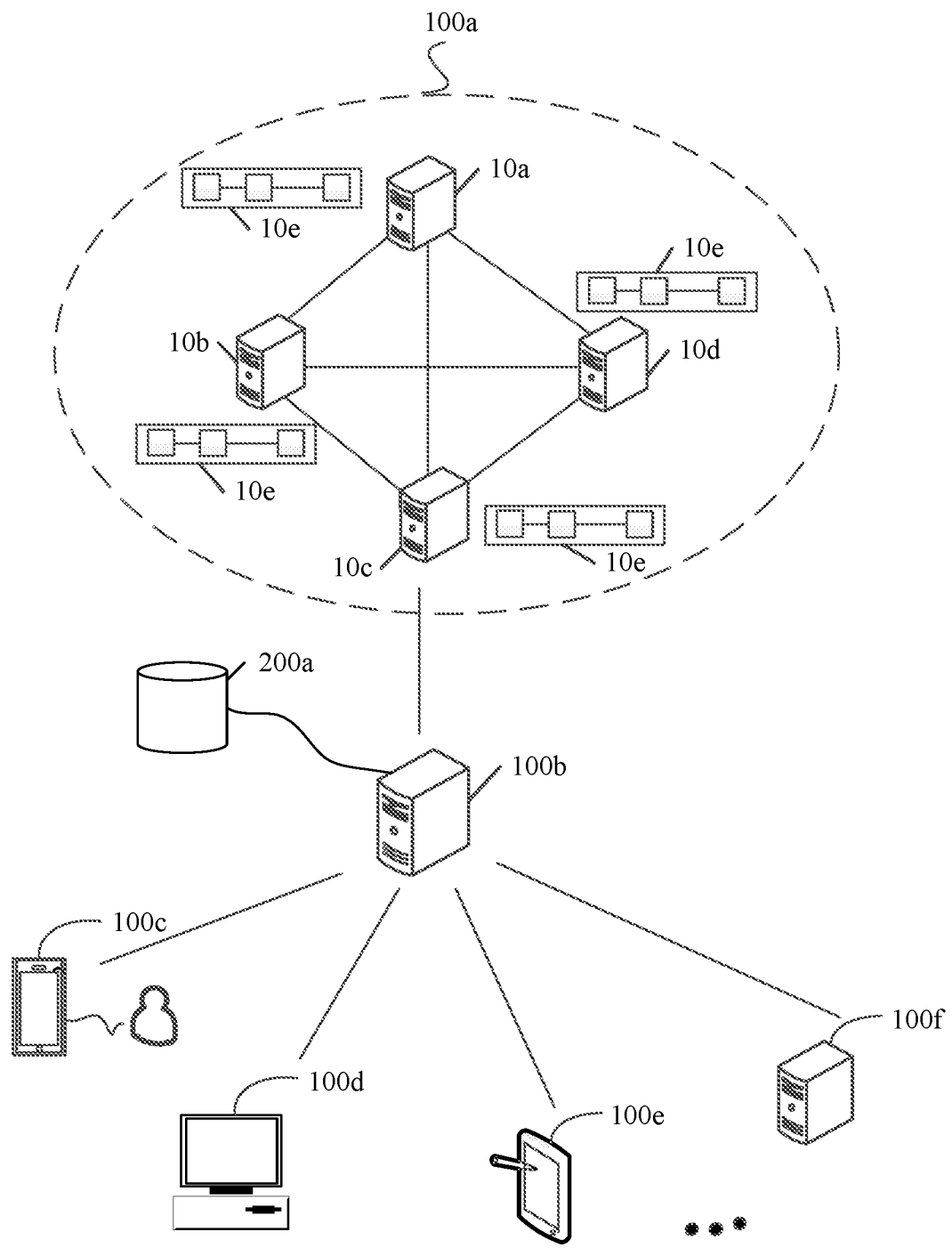
FIG. 1 is a schematic diagram of a system architecture provided by an example of the present subject matter.

The technical solutions in examples of the present subject matter are clearly and completely described in the following with reference to the accompanying drawings in examples of the present subject matter. Apparently, the described examples are merely some rather than all of the examples of the present subject matter. Based on examples in the present subject matter, all the other examples obtained by a person skilled in the art without involving creative efforts fall within the scope of the present subject matter.

To facilitate understanding, some terms are first briefly explained as follows.

1. Blockchain: in a narrow sense, the blockchain is a chain data structure with a block as a basic unit, and a digital digest is used in the block to check historical transactions acquired before, which can satisfy the needs of tamper-proof and scalability in a distributed accounting scene. In a broad sense, the blockchain also refers to a distributed accounting technology implemented by a blockchain architecture, including a distributed consensus, privacy and security protection, a peer to peer (P2P) communication technology, a network protocol, a smart contract, etc. A goal of the blockchain is to realize a distributed ledger of data records that allows only additions, not deletions. A basic structure of the ledger is a linear linked list. The linked list is composed of several "blocks" connected in series. A hash value of a preceding block is recorded in a succeeding block, and the legality of each block (and transactions in the block) may be quickly checked by calculating the hash value. If a node in the network proposes to add a new block, the block must achieve a consensus confirmation through a consensus mechanism.

2. Blockchain node: a blockchain network distinguishes the nodes into consensus nodes (which may also be referred to as core nodes) and synchronization nodes (which may include data nodes and light nodes). The consensus node is responsible for a consensus service of a blockchain whole network. The synchronization node is responsible for synchronizing ledger information of the consensus node, namely, synchronizing the latest block data. Whether it is the consensus node or the synchronization node, its internal structure includes a network communication component, because the blockchain network is essentially a P2P network, which needs to communicate with other nodes in the blockchain network through the P2P network communication component. Resources and services in the blockchain network are distributed on each node, and the transmission of information and the implementation of services are performed directly between nodes without the intervention of intermediate links or centralized servers (third-party devices).

3. Public key and private key: the public key and the private key are a key pair (namely, one public key and one private key) obtained through an algorithm. The public key is a disclosed part of the key pair, and the private key is a non-disclosed part. The public key is commonly used for encrypting data, verifying digital signatures, etc. It can be ensured by this algorithm that the resulting key pair is unique, and when using this key pair, if a piece of data is encrypted with one of the keys, it must be decrypted with the other key, for example, if the data is encrypted with the public key, it must be decrypted with the private key, and if the data is encrypted with the private key, it must be decrypted with the public key, otherwise the decryption will not be successful.

4. Hash value: also referred to as an information feature value or a feature value. The hash value is generated by converting input data of an arbitrary length into a password through a hash algorithm and performing a fixed output, and original input data cannot be retrieved by decrypting the hash value, which is a one-way encryption function. In the blockchain, each block (except an initial block) contains the hash value of the preceding block, which is referred to as a parent block of a current block. The hash value is a potential core base and the most important aspect in the blockchain technology, preserving the authenticity of data recorded and viewed, as well as the integrity of the blockchain as a whole.

5. Smart contract: a computer agreement intended to disseminate, verify, or execute protocols in an informative manner. In a blockchain system, the smart contract (referred to as a contract) is a code that can be understood and executed by each node of the blockchain system, and can execute any logic and obtain a result. In practice application, the smart contract is managed and tried through transactions on the blockchain. Each transaction corresponds to a remote procedure call (RPC) request to the blockchain system. If the smart contract is equivalent to an executable program, the blockchain is equivalent to an operating system providing a runtime environment. The blockchain may contain a plurality of contracts, differentiated by contract identity (ID), identification number, or name. The governance consensus committee contract described below is a smart contract provided by examples of the present subject matter for managing the consensus node, which may include recording a node state of the consensus node, dynamically joining the consensus node, eliminating an abnormal consensus node, etc.

6. Wallet: a function for providing a transaction for a digital asset, including initiating a transaction, namely, transmitting a transaction record of a current transaction to other nodes in the blockchain system, and after the other nodes are verified successfully, as a response for acknowledging that the transaction is valid, record data of the transaction is stored in a temporary block of the blockchain. In addition, the wallet also supports a function of querying the remaining digital assets in a digital asset address.

Referring to FIG. 1, it is a schematic diagram of a system architecture provided by an example of the present subject matter. As shown in FIG. 1, the system may include a blockchain network 100a, an application server 100b, a terminal device cluster, and a storage device 200a. The blockchain network 100a may include: a blockchain node 10a, a blockchain node 10b, a blockchain node 10c, and a blockchain node 10d. It is to be understood that the blockchain network 100a may include one or more blockchain nodes, and examples of the present subject matter do not limit a number of blockchain nodes. In an example, in the blockchain network 100a, the blockchain node the blockchain node 10b, and the blockchain node 10d can perform data interaction through a network connection with the blockchain node 10c. Each blockchain node (such as the blockchain node 10a, the blockchain node 10b, the blockchain node 10c, and the blockchain node 10d) in the blockchain network 100a may be used for maintaining the same blockchain (such as blockchain 10e shown in FIG. 1). A P2P network may be formed between any two blockchain nodes in the blockchain network 100a, and the P2P network may adopt a P2P protocol. The P2P protocol is an application layer protocol running on a transmission control protocol (TCP). In a distributed system, any device, such as a server and a terminal may join the blockchain to become the blockchain node.

In an example, the blockchain node 10a, the blockchain node 10b, the blockchain node 10c, and the blockchain node 10d, etc. as shown in FIG. 1 may have a one-to-one corresponding relationship with a respective role (namely, an entity object in a respective business scene) needing to access the blockchain network 100a. The business scene here may specifically include an electronic bill scene, a social scene, a resource issue scene, a payment scene, etc. At this moment, business data information in the respective business scenes may specifically include electronic bill information in the electronic bill scene, data interaction information in the social scene, resource issue information in the resource issue scene, asset flow records in the payment scene, etc. and the specific content of the business data information in the respective business scenes will not be listed one by one here.

The above-mentioned system may include one or more application servers, and a number of application servers will not be limited here. An application server 100b as shown in FIG. 1 may perform a network connection with the blockchain network 100a to enable data interaction with the blockchain network 100a through the network connection. In addition, the application server 100b as shown in FIG. 1 may perform a network connection with the storage device 200a to enable data interaction with the storage device 200a through the network connection. The application server 100b may be a background server corresponding to an application having a function for processing a business associated with the digital asset in the blockchain network 100a.

The storage device 200a may be a device having a data storage function, such as a cloud file server or inter planetary file system (IPFS) distributed storage, and the storage device 200a may provide a function of storing data for the terminal device cluster, the application server 100b, etc.

The terminal device cluster may include a terminal device 100c, a terminal device 100d, a terminal device 100e, . . . , and a terminal device 100f. It is to be understood that the terminal device cluster may include one or more terminal devices, and examples of the present subject matter do not limit a number of terminal devices. There may be a network connection between the terminal devices in the terminal device cluster, for example between the terminal device 100c and the terminal device 100d. Meanwhile, any terminal device in the terminal device cluster may have a network connection with the application server 100b, for example between the terminal device 100f and the application server 100b. Meanwhile, any terminal device in the terminal device cluster may have a network connection with the blockchain network 100a, for example between the terminal device 100d and the blockchain network 100a. Meanwhile, any terminal device in the terminal device cluster may have a network connection with the storage device 200a, for example between the terminal device 100f and the storage device 200a. The above-mentioned network connection is not limited to a connection way, and may be directly or indirectly connected by a wired network, may be directly or indirectly connected by a wireless network, and may also be directly or indirectly connected by other ways, and examples of the present subject matter are not limited herein.

In an example, each terminal device in the terminal device cluster as shown in FIG. 1 may be installed with an application client, and when the application client runs in each terminal device, the data interaction may be performed with the above-mentioned application server 100b as shown in FIG. 1 through the above-mentioned network connections. In an example, the application client may be an application client having a function of processing the digital asset, such as a video application, a live application, a social application, an instant communication application, a gaming application, a music application, a shopping application, a novel application, a browser, and a digital asset application. In an example, the application client may be an independent client, and may also be an embedded sub-client integrated into a client (such as a social client, an educational client, and a multimedia client), without limitation. Taking the digital asset application as an example, the application server 100b may be a collection including a plurality of servers, such as the background server corresponding to the digital asset application and a data processing server. Therefore, each terminal device may perform data transmission with the application server 100b through the application client corresponding to the digital asset application, for example, each terminal device may upload a digital asset transfer request to the application server 100b through the application client of the digital asset application, and then the application server 100b may issue the digital asset transfer request to other terminal devices or transmit same to the blockchain network 100a.

In a specific implementation of the present subject matter, relevant data such as user information may be involved. When examples of the present subject matter are applied to a specific product or technology, user permission or consent shall be obtained, and the collection, use, and processing of the relevant data need to comply with the relevant laws, regulations, and standards of the relevant countries and regions.

To facilitate understanding and explanation, examples of the present subject matter may select one terminal device in the terminal device cluster shown in FIG. 1 as a target terminal device, for example, taking the terminal device 100c as the target terminal device. When the terminal device 100c acquires a first resource acquisition request in a digital asset application logged in through an object identification, the first resource acquisition request may be transmitted to the application server 100b. In an example of the present subject matter, an application identity for the digital asset application registered by a use object (namely, a terminal user) corresponding to the terminal device 100c in the blockchain network 100a is referred to as the object identification. The digital asset application may be the above-mentioned wallet. The first resource acquisition request refers to a request for requesting the blockchain network 100a to acquire a target virtual resource. The target virtual resource may be any interactive virtual resource, and specifically may include a three-dimensional model and a two-dimensional model.

Further, the application server 100b may forward the first resource acquisition request to the blockchain network 100a to make the blockchain network 100a query a target ticket identification associated with the object identification and the target virtual resource based on the first resource acquisition request, and metadata having a binding relationship with the target ticket identification may further be acquired. The target ticket identification is used for characterizing that the object identification has ownership of the target virtual resource. According to the metadata returned by the blockchain network 100a, the application server 100b may acquire a storage path corresponding to the target virtual resource and then may transmit a second resource acquisition request to the storage device 200a corresponding to the storage path. Further, the application server 100b acquires resource data returned by the storage device 200a for the target virtual resource. Further, the application server 100b returns the resource data to the terminal device 100c, and after receiving the resource data returned by the application server 100b, the terminal device 100c may display the target virtual resource on its corresponding screen. Further, the terminal device 100c may control the target virtual resource to perform an interaction output in response to a triggering operation for interacting with the target virtual resource.

In an example, the application server 100b may return the metadata returned by the blockchain network 100a to the terminal device 100c, and the terminal device 100c may acquire the storage path corresponding to the target virtual resource by parsing the metadata. The subsequent process of acquiring the target virtual resource is consistent with the process of the application server 100b acquiring the target virtual resource, and will not be described in detail here. In an example, the application server 100b may return the storage path to the terminal device 100c, and the subsequent process of the terminal device 100c acquiring the target virtual resource based on the storage path is consistent with the above-mentioned process, and will not be described in detail here. In an example, the terminal device 100c may directly transmit the first resource acquisition request to the blockchain network 100a so that the blockchain network 100a returns metadata for the target virtual resource. The subsequent process of acquiring the target virtual resource may refer to the above description, and will not be described in detail here.

The above-mentioned application server 100b, terminal device 100c, terminal device 100d, terminal device 100e, . . . , and terminal device 100f may all be blockchain nodes in the blockchain network 100a. The above-mentioned data (such as the storage path) may be stored, and a storage way may be that the blockchain node generates the block according to the data and adds the block to the blockchain for storage.

According to the above description, it can be seen that methods provided by examples of the present subject matter may be performed by a computer device, including but not limited to the terminal device or the application server. The above-mentioned application server may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a content delivery network (CDN), and a large data and artificial intelligence platform. The above-mentioned terminal device includes but is not limited to a mobile phone, a computer, an intelligent voice interaction device, an intelligent home appliance, a vehicle-mounted terminal, etc.

Figure 2:
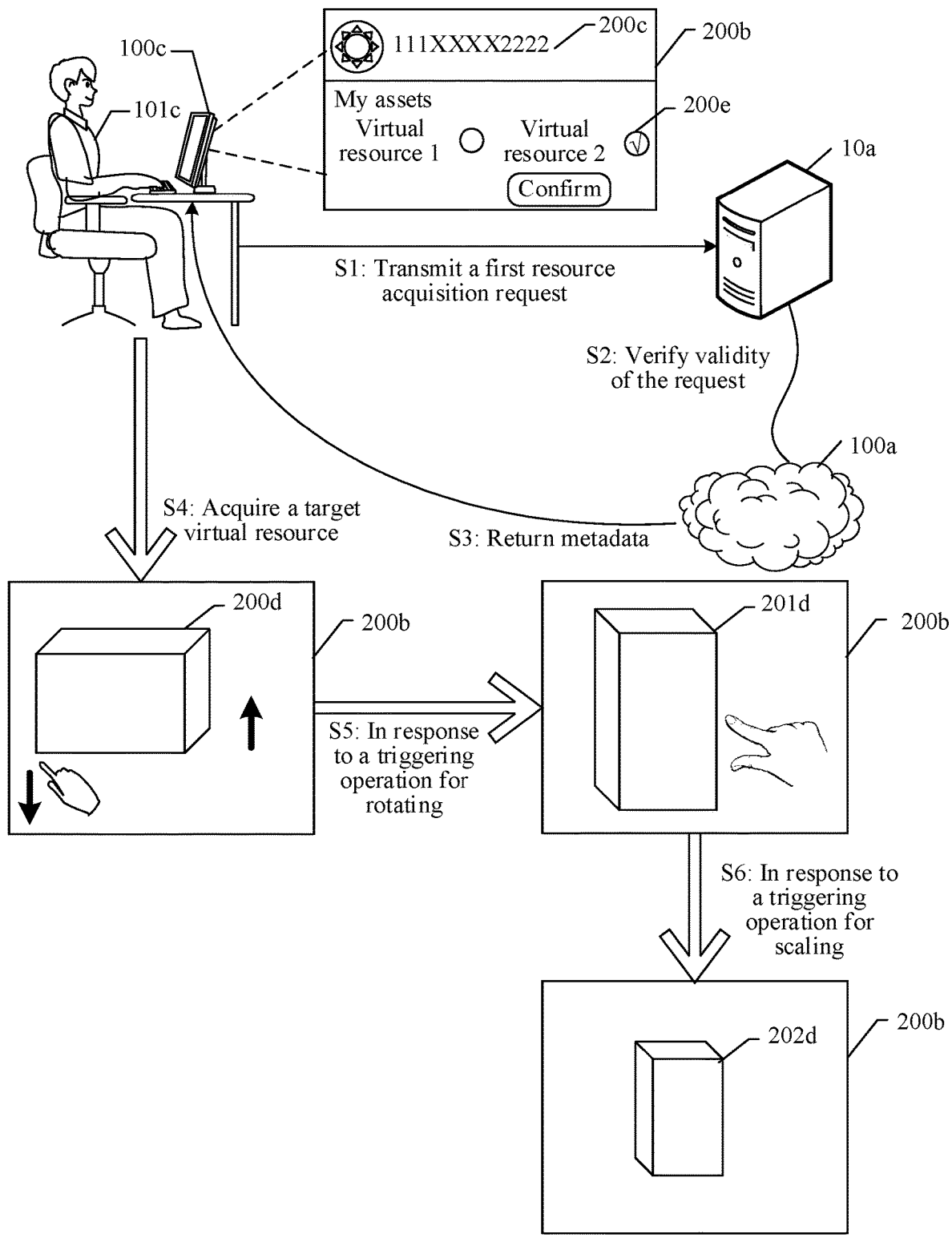
FIG. 2 is a schematic diagram of a blockchain-based data processing scene provided by an example of the present subject matter.

Further, referring to FIG. 2, it is a schematic diagram of a blockchain-based data processing scene provided by an example of the present subject matter. An implementation process of the data processing scene may be performed in the application server, may also be performed in the terminal device, and may also be performed interactively in the terminal device and the application server, and is not limited thereto. The terminal device may be any terminal device in the terminal device cluster in the example corresponding to the above-mentioned FIG. 1. FIG. 2 illustrates by taking the terminal device 100c as an example, and the application server may be the application server 100b in the example corresponding to the above-mentioned FIG. 1. Examples of the present subject matter may be applied to various scenes, including but not limited to cloud technology, artificial intelligence, intelligent transport, assisted driving, etc.

As shown in FIG. 2, an operation object 101c has a binding relationship with the terminal device 100c, and then the operation object 101c may log in to a digital asset application 200b installed by the terminal device 100c through the object identification. In an example of the present subject matter, an example identification "111XXXX2222" is taken as the object identification, and the object identification can be understood as an identity (address) of the operation object 101c for the digital asset application 200b in the blockchain network 100a. A presentation interface of the digital asset application 200b provided by the terminal device 100c may further include an avatar of the operation object 101c, an asset name corresponding to an asset held by the operation object 101c having an object identification 200c (such as a virtual resource 1 and a virtual resource 2 illustrated in FIG. 2), and a selection control bound to each asset name (such as a selection control 200e corresponding to the virtual resource 2 illustrated in FIG. 2). The operation object 101c may perform a triggering operation on the presentation interface of the digital asset application 200b provided by the terminal device 100c, for example, the selection control 200e may be triggered, and then a "confirm" control on the presentation interface of the digital asset application 200b is triggered. At this moment, the terminal device 100c determines an asset (resource) corresponding to the virtual resource 2 as the target virtual resource. In response to an acquisition operation on the target virtual resource, step S1 shown in FIG. 2 is performed, namely, transmitting the first resource acquisition request to the blockchain node 10a.

After acquiring the first resource acquisition request transmitted by the terminal device 100c, the blockchain node 10a may broadcast same to the blockchain network 100a so that the blockchain network 100a performs validity verification on the request (namely, performing a consensus), namely, step S2 in FIG. 2. A specific process of verification may refer to the following description of the example corresponding to FIG. 3. When the blockchain network 100a determines that the first resource acquisition request is a legal request, the metadata having the binding relationship with the target ticket identification (a ticket identification to be verified is equivalent to the target ticket identification at this moment) is acquired to perform step S3 in FIG. 2. The target ticket identification is an identification of an on-chain virtual resource corresponding to the target virtual resource (an off-chain virtual resource) in the blockchain network 100a, which may characterize that the object identification has ownership of the target virtual resource.

After the terminal device 100c acquires the metadata, the target virtual resource may be acquired in the digital asset application 200b, namely, step S4 in FIG. 2. Further, the target virtual resource may be displayed in the digital asset application 200b, and to facilitate understanding, an example target virtual resource of examples of the present subject matter is an interactive three-dimensional model 200d. Further, the terminal device 200c acquires a rotation indication direction in response to a triggering operation for rotating the three-dimensional model and controls the three-dimensional model to rotate according to the rotation indication direction. The terminal device acquires a scaling ratio in response to a triggering operation for scaling the three-dimensional model and controls the three-dimensional model to scale according to the scaling ratio.

As shown in FIG. 2, the operation object 101c views the target virtual resource (such as the three-dimensional model 200d illustrated in FIG. 2) through the digital asset application 200b, and the three-dimensional model 200d has an interaction property. If the operation object 101c uses a finger to slide the three-dimensional model 200d left and right or up and down on a touch screen, the three-dimensional model 200d may make a respective rotation effect, namely, performing smooth rotation in various directions according to the operation of the operation object 101c, as shown in step S5 in FIG. 2. The terminal device 100c acquires a rotation indication direction and angle in response to a triggering operation for rotating the three-dimensional model 200d. Examples of the present subject matter take the presentation interface as a reference interface. Therefore, when the operation object 101c in FIG. 2 performs a downward rotation on the three-dimensional model 200d with a rotation angle is 90°, the terminal device 100c controls the three-dimensional model 200d to rotate 90° downward, and therefore a three-dimensional model 201d may be displayed in the presentation interface.

In an example, if the operation subject 101c performs a "zoom-out" or "zoom-in" operation using a finger, step S6 in FIG. 2 is performed, namely, the terminal device 100c acquires the scaling ratio in response to a triggering operation for scaling the three-dimensional model 200d and controls the three-dimensional model 201d to scale according to the scaling ratio. Examples of the present subject matter are described taking zooming-out as an example so that a zoomed-out three-dimensional model 202d may be displayed in the digital asset application 200b. In an example, the three-dimensional model 200d, the three-dimensional model 201d, and the three-dimensional model 202d characterize the same three-dimensional model, but representation forms of the three are different.

In an example, the target virtual resource is presented in the terminal device 100c in the form of a static image, a dynamic image, or a video clip, but examples of the present subject matter perform an interaction operation on the target virtual resource itself instead of performing an interaction operation on an image or a video including the target virtual resource.

Interfaces and controls shown in FIG. 2 are merely some reference expressions. In an actual business scene, a developer may perform relevant design according to product requirements, and examples of the present subject matter do not limit the specific forms of the interfaces and controls involved.

Figure 3:
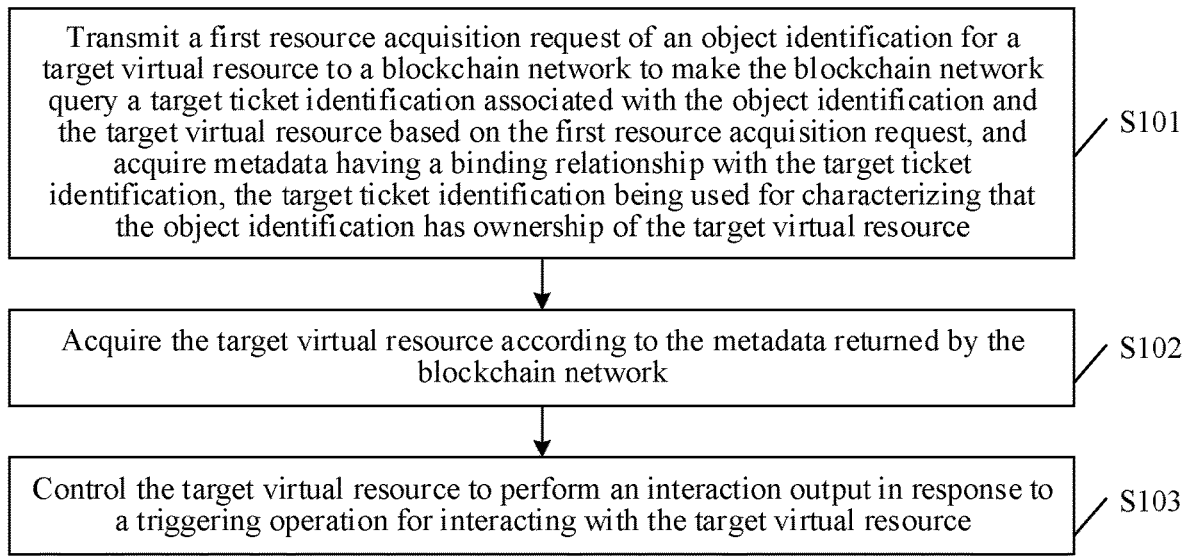
FIG. 3 is a flow schematic diagram of a blockchain-based data processing method provided by an example of the present subject matter.

Further, referring to FIG. 3, it is a flow schematic diagram of a blockchain-based data processing method provided by an example of the present subject matter. Examples of the present subject matter may be applied to various scenes, including but not limited to cloud technology, artificial intelligence, intelligent transport, assisted driving, etc. The blockchain-based data processing method may be performed by the application server in FIG. 1, may also be performed by the terminal device in FIG. 1, and may also be interactively performed by the application server and the terminal device in FIG. 1. To facilitate understanding, examples of the present subject matter will be described by taking the terminal device performing the method as an example. As shown in FIG. 3, the blockchain-based data processing method may include at least the following step S101 to step S103.

Step S101: Transmit a first resource acquisition request of an object identification for a target virtual resource to a blockchain network to make the blockchain network query a target ticket identification associated with the object identification and the target virtual resource based on the first resource acquisition request, and acquire metadata having the binding relationship with the target ticket identification, the target ticket identification is used for characterizing that the object identification has ownership of the target virtual resource.

Specifically, a ticket identification to be verified for the target virtual resource is acquired in response to a resource acquisition instruction in the digital asset application logged in through the object identification. The first resource acquisition request is generated according to the ticket identification to be verified and the object identification, and the first resource acquisition request is signed to obtain signature information. The first resource acquisition request carrying the signature information is transmitted to the blockchain network. The signature information is used for indicating validity of the blockchain network verifying the object identification. The object identification is used for indicating the blockchain network to acquire a ticket identification set having a binding relationship with the object identification in a case that determining the object identification having a legal permission. The ticket identification set includes the target ticket identification. The ticket identification to be verified is used for indicating the blockchain network to determine a holding permission of the object identification for the target virtual resource according to the ticket identification set. The holding permission is used for characterizing that the ticket identification to be verified is the same as the target ticket identification.

Figure 4:
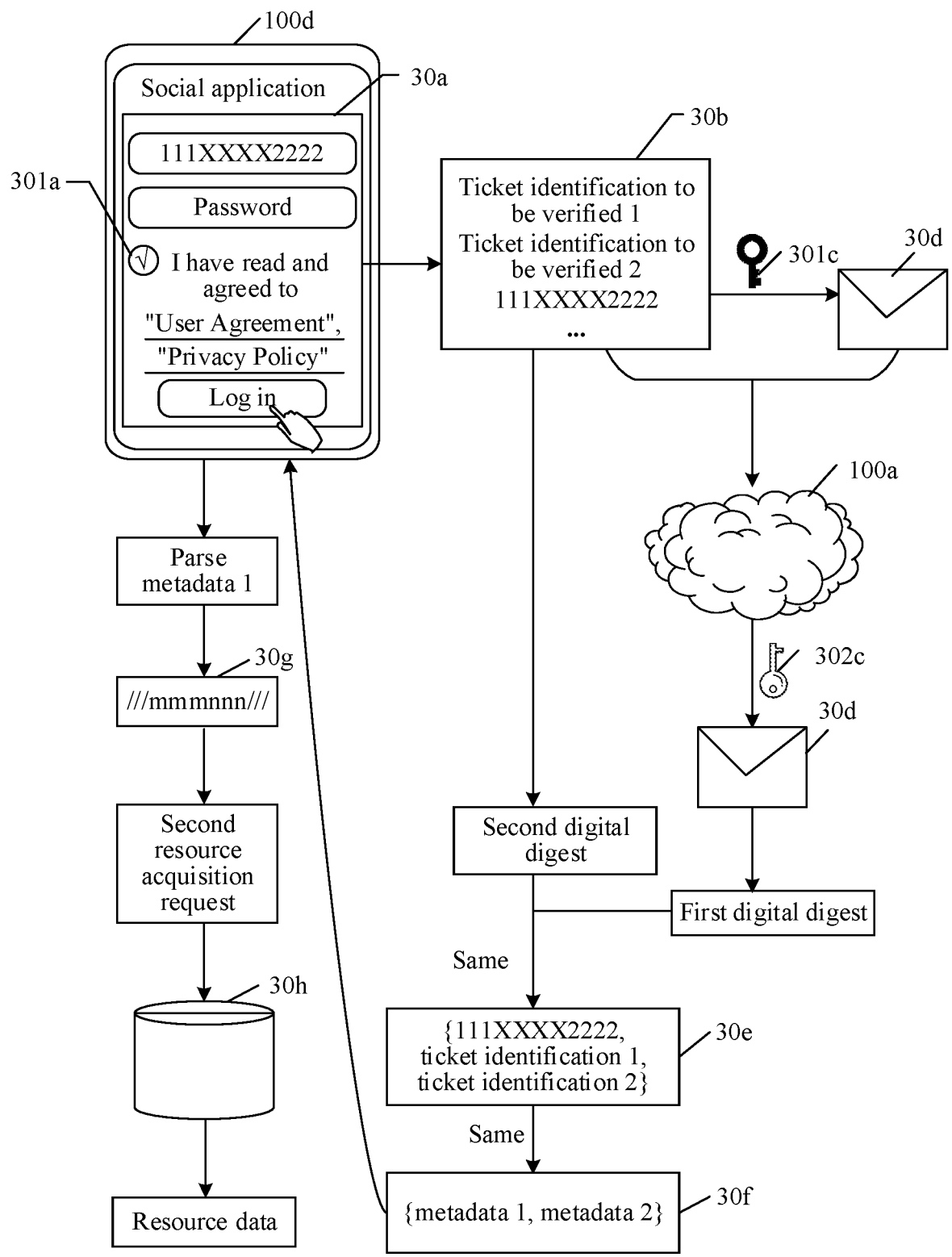
FIG. 4 is a schematic diagram of a blockchain-based data processing scene provided by an example of the present subject matter.

The digital asset application may be an independent application (as shown in FIG. 2 above), may be a subprogram application integrated in the independent application (as shown in FIG. 3 below), and may also be a plug-in embedded in the subprogram application. Examples of the present subject matter do not limit the implementation form of the digital asset application. Referring to FIG. 4, it is a schematic diagram of a blockchain-based data processing scene provided by an example of the present subject matter. As shown in FIG. 4, when a use object (equivalent to the above-mentioned operation object in FIG. 2) corresponding to the terminal device 100d opens a digital asset application 30a (the digital asset application 30a is integrated as an applet in the social application) in the independent application (such as the social application illustrated in FIG. 2) installed in the terminal device 100d, the terminal device 100d may display a login interface for the digital asset application 30a, and the login interface may prompt the use object to input an identity and a password. In one example, the identity may be an address registered in the blockchain network 100a by the use object for the digital asset application 30a, and the address is bound to a public-private key pair, equivalent to the object identification, such as the identification 111XXXX2222 illustrated in FIG. 4. In another example, the identity may also be an application identification of the use object in the digital asset application 30a, the application identification having a mapping relationship with the object identification, and when the use object inputs the application identification, the terminal device 100d may acquire the object identification according to the above-mentioned mapping relationship and the application identification to access the blockchain network 100a. In another example, the identity may also be a cell phone number of the use object. The cell phone number is similar to the above-mentioned application identification and has a mapping relationship with the object identification to access the blockchain network 100a. In addition, the use object may also be authorized to log in through the social application, and examples of the present subject matter do not limit the way in which the use object logs in the digital asset application 30a in the terminal device 100d, as long as the use object is authorized.

Referring again to FIG. 4, when the use object inputs the identity and password, the terminal device 100d may prompt the use object to read information related to the user, as illustrated in FIG. 4 prompting the use object to read and understand the "User Agreement" and the "Privacy Policy", and when the use object triggers a read control 301a, the use object may trigger a "login" control. Examples of the present subject matter do not limit the condition of the terminal device 100d responding to the resource acquisition instruction in the digital asset application logged in through the object identification. As described above in FIG. 2, after successfully logging in the digital asset application 30a, the terminal device 100d may present an asset name corresponding to the asset held by the object identification. When the use object selects a certain asset name (such as the virtual resource 2 illustrated in FIG. 2), the above-mentioned resource acquisition instruction is acquired, thereby acquiring the ticket identification to be verified for the target virtual resource. The terminal device 100d may also respond to the above-mentioned resource acquisition instruction in such a manner that when the terminal device 100d successfully logs in the digital asset application 30a, the terminal device 100d responds to the resource acquisition instruction in the digital asset application 30a logged in through the object identification, in which manner the target virtual resource may include all the virtual resources held by the object identification (in the manner provided in FIG. 2, the target virtual resource is one of the virtual resources held by the object identification).

Referring again to FIG. 4, the terminal device 100d acquires the ticket identification to be verified for the target virtual resource, and a total number of the virtual resources held by an example object identification in examples of the present subject matter is two, and therefore two ticket identifications to be verified may be acquired, such as a ticket identification to be verified 1 and a ticket identification to be verified 2 illustrated in FIG. 4. Further, a first resource acquisition request 30b is generated according to the ticket identification to be verified 1, the ticket identification to be verified 2, and the object identification (such as the identification 111XXXX2222 illustrated in FIG. 4). In a practical application scene, the first resource acquisition request 30b may also include other data, such as a hash value corresponding to the target virtual resource, and examples of the present subject matter does not limit the specific content of data carried by the first resource acquisition request 30b.

The terminal device 100d acquires a private key 301c, and signs the first resource acquisition request 30b through the private key 301c to obtain signature information 30d. In an example, terminal device 100d holds an asymmetric key pair for the digital asset application 30a that includes the private key 301c and a public key 302c. The terminal device 100d transmits the first resource acquisition request 30b carrying the signature information 30d to the blockchain network 100a. As shown in FIG. 4, the blockchain network 100a performs signature verification on the signature information 30d through the public key 302c to obtain a first digital digest, and acquires a second digital digest corresponding to the first resource acquisition request 30b through the hash algorithm. Comparing the first digital digest with the second digital digest, if the two are different, the blockchain network 100a may determine that the object identification does not have the legal permission, and rejects to process the first resource acquisition request 30b; if the first digital digest is the same as the second digital digest, it may be determined that the object identification has the legal permission. Further, the blockchain network 100a acquires a ticket identification set 30e having the binding relationship with the object identification. Examples of the present subject matter do not limit the binding way between the object identification and the ticket identification set 30e, which may be set according to the practical application scene. An example of examples of the present subject matter is that the ticket identification set 30e includes the object identification, and a ticket identification corresponding to a ticket held by the object identification, namely, the target ticket identification. In examples of the present subject matter, a total number corresponding to the illustrated target ticket identification is two, such as the ticket identification 1 and the ticket identification 2 illustrated in FIG. 4.

The blockchain network 100a may compare the ticket identification to be verified 1 with the target ticket identification (such as the ticket identification 1 and the ticket identification 2 illustrated in FIG. 4). If there is no ticket identification in the target ticket identification which is the same as the ticket identification to be verified 1, it may be determined that the object identification does not have a holding permission of the ticket identification to be verified 1 (equivalent to the object identification not having the ownership of the virtual resource corresponding to the ticket identification to be verified 1), or the ticket identification to be verified 1 is not a legal ticket identification. At this moment, the blockchain network 100a may return a resource acquisition failure message for the ticket identification to be verified 1 to the terminal device 100d. If there is a ticket identification (such as the ticket identification 1) in the target ticket identification which is the same as the ticket identification to be verified 1, the blockchain network 100a may determine that the object identification has the holding permission of the ticket identification to be verified 1, which is equivalent to determining that the object identification has the ownership of the virtual resource corresponding to the ticket identification to be verified 1. At this moment, metadata having a binding relationship with the ticket identification to be verified 1 may be acquired. The process of the blockchain network 100a for the ticket identification to be verified 2 is identical to the above-mentioned process of the ticket identification to be verified 1, so refer to the above-mentioned description, and will not be described in detail here.

Referring again to FIG. 4, in examples of the present subject matter, the illustrated ticket identification to be verified is the same as the target ticket identification, and therefore the blockchain network may acquire the metadata, including metadata 1 having a binding relationship with the ticket identification to be verified 1 and metadata 2 having a binding relationship with the ticket identification to be verified 2 as illustrated in FIG. 4.

Step S102: Acquire the target virtual resource according to the metadata returned by the blockchain network.

Specifically, the metadata transmitted by the blockchain network is acquired in the digital asset application logged in through the object identification. The metadata is parsed to acquire the storage path corresponding to the target virtual resource, and the second resource acquisition request is transmitted to the storage device corresponding to the storage path. Resource data for the target virtual resource returned by the storage device is acquired, and the target virtual resource is displayed according to the resource data.

In an example, a specific process of displaying the target virtual resource according to the resource data may include: parsing the resource data to acquire resource data to be rendered; and calling a physics engine, and rendering the resource data to be rendered through a rendering pipeline in the physics engine to obtain the target virtual resource for displaying in the presentation interface. The rendering pipeline, referred to as the rendering pipeline, is a parallel processing unit that processes graphics signals independently of each other inside a display chip.

In an example, a specific process of obtaining the target virtual resource for displaying in the presentation interface may include: acquiring a three-dimensional vertex coordinate of a vertex of the target virtual resource in a three-dimensional space in the resource data to be rendered; acquiring a target projection position, calling a vertex shader, and mapping the three-dimensional vertex coordinate to a two-dimensional space according to the target projection position to obtain a two-dimensional vertex coordinate of the vertex of the target virtual resource under the target projection position; drawing a two-dimensional line corresponding to the two-dimensional vertex coordinate and a two-dimensional plane generated by the two-dimensional line in the two-dimensional space according to a connection relationship between the vertices of the target virtual resource; and displaying the target virtual resource under the target projection position in the presentation interface according to the two-dimensional line and the two-dimensional plane.

In an example, data to be rendered includes a target color corresponding to the target virtual resource. A specific process of displaying the target virtual resource under the target projection position in the presentation interface may include: determining a geometric primitive of the target virtual resource in the two-dimensional space according to the two-dimensional line and the two-dimensional plane; rasterizing the geometric primitive to acquire a fragment to be shaded including the target virtual resource displayed in the target projection position; and rendering the target virtual resource in the fragment to be shaded through a fragment shader, and displaying the target virtual resource having the target color in the presentation interface based on a rendering result.

Referring to FIG. 4 in combination with step S101, in the digital asset application logged in through the object identification (such as the identification 111XXXX2222 illustrated in FIG. 4), the terminal device 100d acquires the metadata transmitted by the blockchain network 100a. The metadata is data about data, describing the target virtual resource and mainly includes information describing a data property of the target virtual resource, which is used for supporting functions such as indicating a storage position (namely, the storage path), historical data, resource searching, and file recording.

Further, the terminal device 100d parses the metadata. It is to be understood that the process of the terminal device 100d parsing the metadata 1 and acquiring the virtual resource corresponding to the metadata 1 is consistent with the process of parsing the metadata 2 and acquiring the virtual resource corresponding to the metadata 2, and therefore processing the metadata 1 is described here as an example, and the process of acquiring other virtual resources in the target virtual resource is described below.

The terminal device 100d parses the metadata 1 and acquires a storage path 30g of the virtual resource (namely, the target virtual resource) corresponding to the ticket identification 1, as illustrated in "///mmmnnn///" in FIG. 4, and then may transmit the second resource acquisition request to a storage device 30h corresponding to the storage path. In an example, the terminal device 100d signs the second resource acquisition request using the private key 301c to obtain signature information corresponding to the second resource acquisition request (in order to distinguish the signature information corresponding to the first resource acquisition request in the foregoing text, the signature information herein is referred to as second signature information), and transmits the second resource acquisition request carrying the second signature information to the storage device 30h so that the storage device 30h confirms the validity of the terminal device 100d based on the second signature information. A specific process may refer to the above process of the blockchain network 100a performing validity verification on the first resource acquisition request based on the public key 302c.

Figure 5:
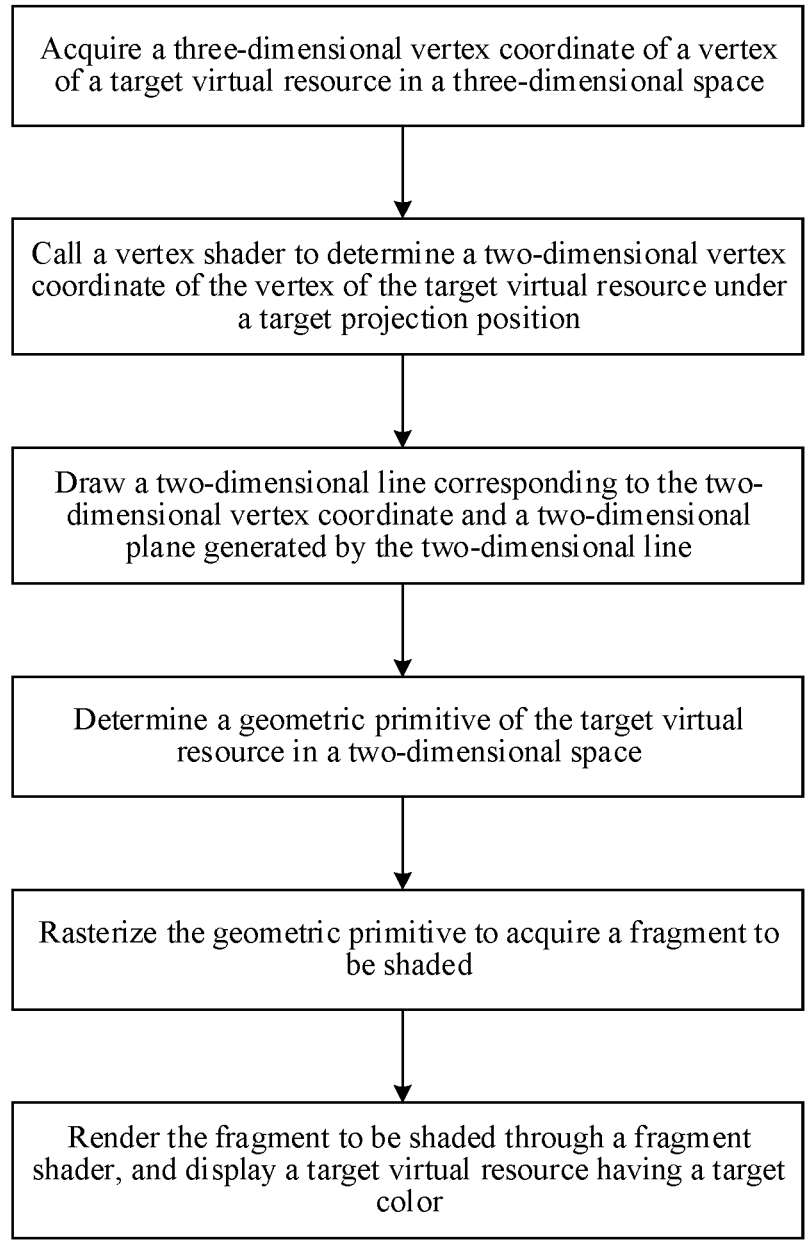
FIG. 5 is a flow schematic diagram of a data processing method provided by an example of the present subject matter.

The terminal device 100d acquires resource data of the virtual resource corresponding to the ticket identification 1 returned by the storage device 30h. The resource data may include original data of the target virtual resource and interaction logic of the target virtual resource, etc. The terminal device 100d first parses the resource data to acquire the resource data to be rendered, and then calls the physics engine to render the resource data to be rendered through the rendering pipeline in the physics engine. In an example, the physics engine may be a three-dimensional web graphics library (WebGL). Referring to FIG. 5, it is a flow schematic diagram of a data processing method provided by an example of the present subject matter. As shown in FIG. 5, the rendering process is actually a process in which the terminal device maps three-dimensional data of the target virtual resource to the two-dimensional space. Firstly, the three-dimensional vertex coordinate of the vertex of the target virtual resource in the three-dimensional space is acquired from the data to be rendered. According to a set projection position (namely, the target projection position), the terminal device maps each three-dimensional vertex coordinate to the two-dimensional space through the vertex shader and determines the two-dimensional vertex coordinate. Further, the terminal device may draw the two-dimensional line and the two-dimensional plane of the target virtual resource on the two-dimensional space according to the connection relationship between the vertices of the target virtual resource so that the geometric primitive of the target virtual resource in the two-dimensional space may be determined. Further, the terminal device rasterizes the geometric primitive. The rasterization refers to corresponding the geometric primitive to a pixel point of a screen of the terminal device, and describing same by a square pixel point to obtain the fragment to be shaded. Finally, each pixel point in the fragment to be shaded is assigned to a respective color using the fragment shader so that the target virtual resource in the three-dimensional space may be rendered on a two-dimensional screen based on the pixel point.

Figure 6:
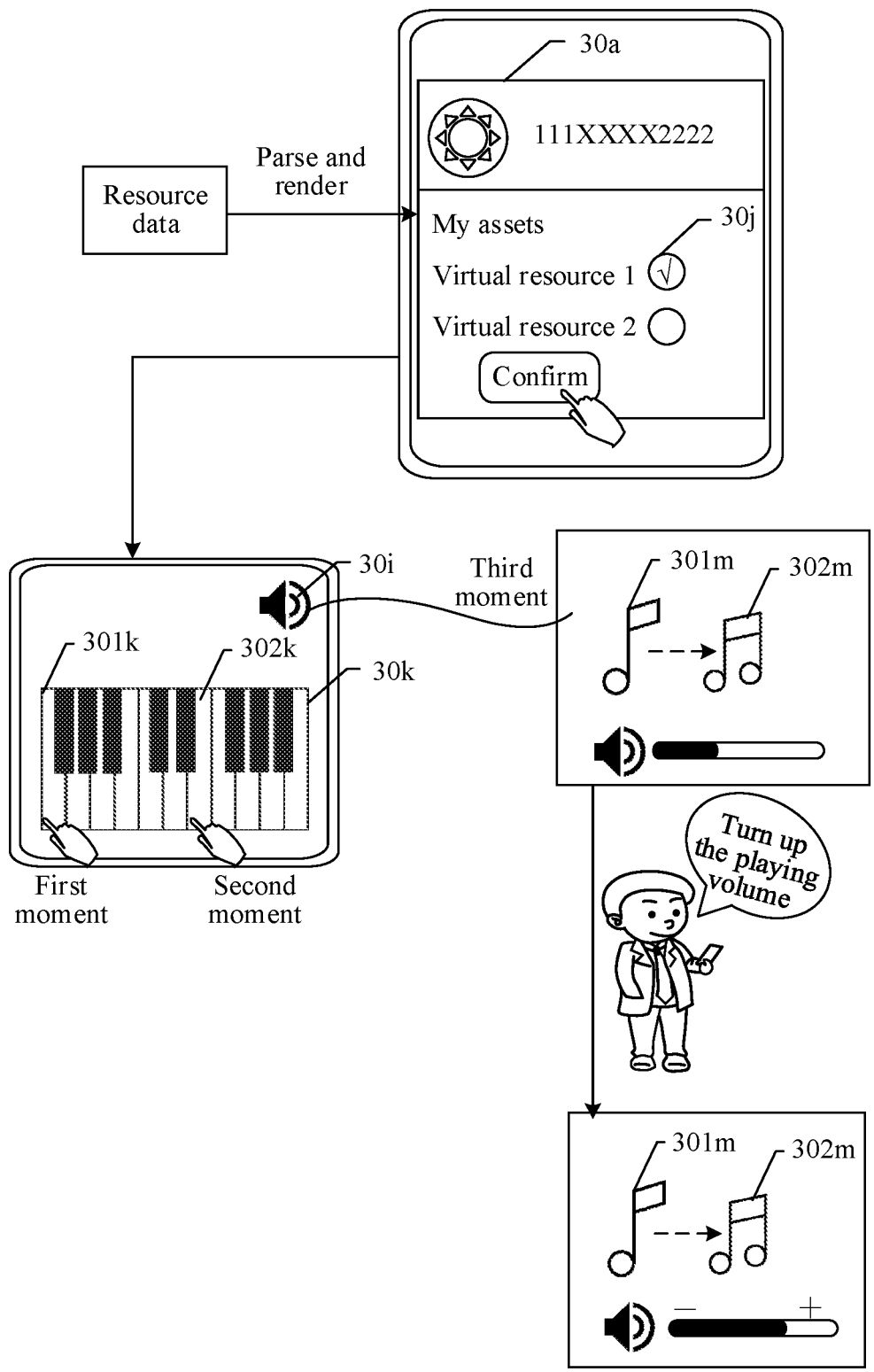
FIG. 6 is a schematic diagram of a blockchain-based data processing scene provided by an example of the present subject matter.

Referring to FIG. 6, it is a schematic diagram of a blockchain-based data processing scene provided by an example of the present subject matter. In conjunction with what is described in FIG. 4 and FIG. 6, it may be seen from step S101 that in examples of the present subject matter, when the terminal device successfully acquires the object identification in the digital asset application, the metadata returned by the blockchain network is acquired, and the storage path corresponding to the target virtual resource may be acquired by parsing the metadata, and then the target virtual resource may be acquired. Therefore, when the terminal device displays the presentation interface for the digital asset application 30a, the terminal device has acquired the target virtual resource (in FIG. 4 and FIG. 6, the target virtual resource may include the asset held by the object identification, such as the virtual resource characterized by the asset name "virtual resource 1" and the virtual resource characterized by the asset name "virtual resource 2"). When the use object triggers a selection control 30j and the "confirm" control, the terminal device may directly display the virtual resource having a binding relationship with the asset name "virtual resource 1". In examples of the present subject matter, the virtual resource having the binding relationship with the asset name "virtual resource 1" is exemplified as a virtual piano 30k having the interaction property.

Step S103: Control the target virtual resource to perform an interaction output in response to a triggering operation for interacting with the target virtual resource.

Specifically, interaction input data is acquired in the digital asset application logged in through the object identification in response to the triggering operation for interacting with the target virtual resource. An interaction type corresponding to the interaction input data is determined through an interaction distribution component, and the interaction input data is synchronized to a data processing component corresponding to the interaction type. Interaction logic is performed in the data processing component according to the interaction input data to obtain interaction output data. The interaction output data is outputted in the target virtual resource.

In an example, the target virtual resource includes Z audio data playing controls. The Z audio data playing controls include a first audio data playing control and a second audio data playing control, Z is a positive integer greater than 1. First audio data corresponding to the first audio data playing control is acquired in response to a triggering operation on the first audio data playing control at a first moment. Second audio data corresponding to the second audio data playing control is acquired in response to a triggering operation on the second audio data playing control at a second moment. The second moment is later than the first moment, and a time interval between the second moment and the first moment is less than a duration threshold. The target virtual resource is controlled to play the first audio data and the second audio data in sequence in a case that there is no response to a triggering operation on the Z audio data playing controls at a third moment. The third moment is later than the second moment, and a time interval between the third moment and the second moment is greater than or equal to the duration threshold.

The target virtual resource in examples of the present subject matter has two properties, one is an asset property, namely, the target virtual resource as the off-chain virtual resource has a corresponding on-chain virtual resource in the blockchain network. The on-chain virtual resource may be characterized by the target ticket identification, and the target ticket identification may be issued to the object identification. The second is an interaction property, and the interaction property described in examples of the present subject matter refers to an interaction between the use object and the target virtual resource, rather than an interaction between the use object and a carrier (such as an image and a video) presenting the target virtual resource. Examples of the present subject matter do not limit the category of the target virtual resource, and may be any virtual resource having the interaction property.

When the use object views the target virtual resource in the digital asset application logged in through the object identification, the use object may interact with the target virtual resource, namely, the triggering operation for interacting with the target virtual resource is performed, and the terminal device may acquire the interaction input data in response to the triggering operation. In an example, the use object may perform the triggering operation for interacting with the target virtual resource by touching the screen of the terminal device, and may perform the above-mentioned triggering operation by a voice input, a keyboard (mouse) input, etc., and may also perform the above-mentioned triggering operation by using various sensors (such as a gravity sensor, a temperature sensor) of the terminal device or a detection component. Examples of the present subject matter do not limit the way of interacting between the use object and the target virtual resource, and may be set according to the practical application scene.

After acquiring the interaction input data, the terminal device may determine the interaction type corresponding to the interaction input data through the interaction distribution component. In an example, the interaction type may be divided into two categories. One is a motion interaction type, such as the three-dimensional model illustrated in FIG. 2; and the other is a multimedia interaction type, such as the virtual piano 30$k$ illustrated in FIG. 6. Further, the terminal device synchronizes the interaction input data to the data processing component corresponding to the interaction type. In an example, the data processing component may be set according to the practical application scene, including but not limited to a physics engine component (configured to render the target virtual resource), a multimedia control component (configured to control the target virtual resource to perform multimedia interaction). In the data processing component, interaction logic may be performed according to the interaction input data. In an example, the interaction logic is set when creating the target virtual resource, and therefore the interaction output data corresponding to the interaction input data may be obtained through the interaction logic.

Figure 7:
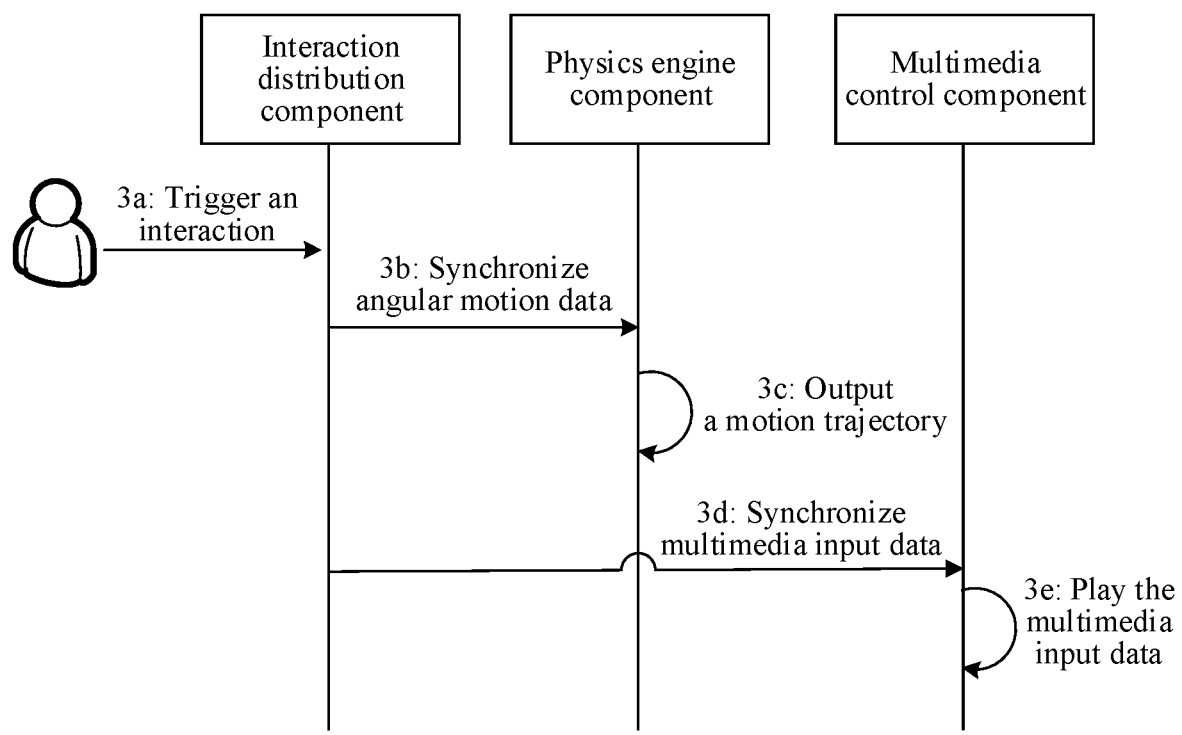
FIG. 7 is a flow schematic diagram of a data processing method provided by an example of the present subject matter.

The above process is described referring to FIG. 7, it is a flow schematic diagram of a data processing method provided by an example of the present subject matter. The data processing method includes step 3$a$ to step 3$e$. Step 3$a$: Trigger an interaction. Specifically, the use object, through the terminal device, performs the triggering operation for interacting with the target virtual resource in the digital asset application logged in through the object identification. The terminal device may include the interaction distribution component, the physics engine component, and the multimedia control component. Step 3$b$ may be performed when the triggering operation is used for performing motion interaction with the target virtual resource, and step 3$d$ may be performed when the triggering operation is used for performing multimedia interaction with the target virtual resource. Step 3$b$: Synchronize angular motion data. Specifically, the terminal device synchronizes the angular motion data to the physics engine component in response to the interaction operation in step 3$a$ to perform step 3$c$. Step 3$c$: The physics engine component may output a motion trajectory to render a target virtual resource after a movement. Step 3$d$: Synchronize multimedia input data. Specifically, the terminal device synchronizes the multimedia input data to the multimedia control component in response to a multimedia interaction operation in step 3$a$ to perform step 3$e$. Step 3$e$: Play multimedia output data. In an example, the target virtual resource may have a function of performing various types of interaction with the use object, such as the multimedia interaction and the motion interaction.

In summary, the target virtual resource (being the digital asset) in examples of the present subject matter has interactivity, and after having the target virtual resource, the object identification may show interaction with the target virtual resource in the digital asset application (such as the wallet application) in addition to holding the ownership right of an on-chain asset of the target virtual resource. For example, if the target virtual resource is a virtual instrument (a drum, a bell, a guitar, a piano), an interaction operation of the user for the virtual instrument may be used to trigger the virtual instrument to present an animation associated with the interaction logic or to play a sound. If the target virtual resource is a game role, in the digital asset application (after separating from a game), the user may still interact with the game role through the interaction operation, for example, after clicking the game role, the game role may have different action feedback, or in a case of opening a pickup, the use object may perform a voice conversation with the game role, etc.; and even if the original game stops operating, the digital asset still has basic interactivity in the digital asset application.

To facilitate understanding, referring again to FIG. 6, the terminal device may display the target virtual resource (such as the virtual piano 30$k$ in FIG. 6, and a voice component 30$i$ having a pickup function and a broadcasting function) in the digital asset application 30$a$. The virtual piano 30$k$ may include a plurality of keys (belonging to the audio data playing control), and the plurality of keys may include a first key 301$k$ (which may be equivalent to the first audio data playing control) and a second key 302k (which may be equivalent to the second audio data playing control). When the use object triggers the first key 301k at the first moment, the terminal device may acquire first audio data corresponding to the first key 301k (such as audio data characterized by a note 301m illustrated in FIG. 6), and the interaction logic may be to continuously detect a triggering operation for interacting with the virtual piano 30k within the duration threshold. If the use object does not trigger the key within the duration threshold, the virtual piano 30k may play the first audio data through the voice component 30i. If the use object triggers the second key 302k within the duration threshold (such as at the second moment), the terminal device may acquire second audio data corresponding to the second key 302k (such as audio data characterized by a note 302m illustrated in FIG. 6). The subsequent process is identical to the above-mentioned process of triggering the first key 301k, and will not be described in detail here. It is to be understood that the description of the above scenes is merely to facilitate understanding, and in practical application, playing of the multimedia data is realized according to the set interaction logic.

As shown in FIG. 6, if the use object does not trigger the key within the duration threshold after acquiring the first audio data and the second audio data, the terminal device may play the first audio data and the second audio data in sequence at an initial volume at the third moment. If the use object wants to increase the volume during playing, the use object may input voice data such as "Turn up the playing volume" through the voice component 30i, and at this moment, the terminal device may increase the playing volume of the voice component 30i through the interaction logic, and then play the first audio data and the second audio data in sequence through the increased volume.

Figure 8:
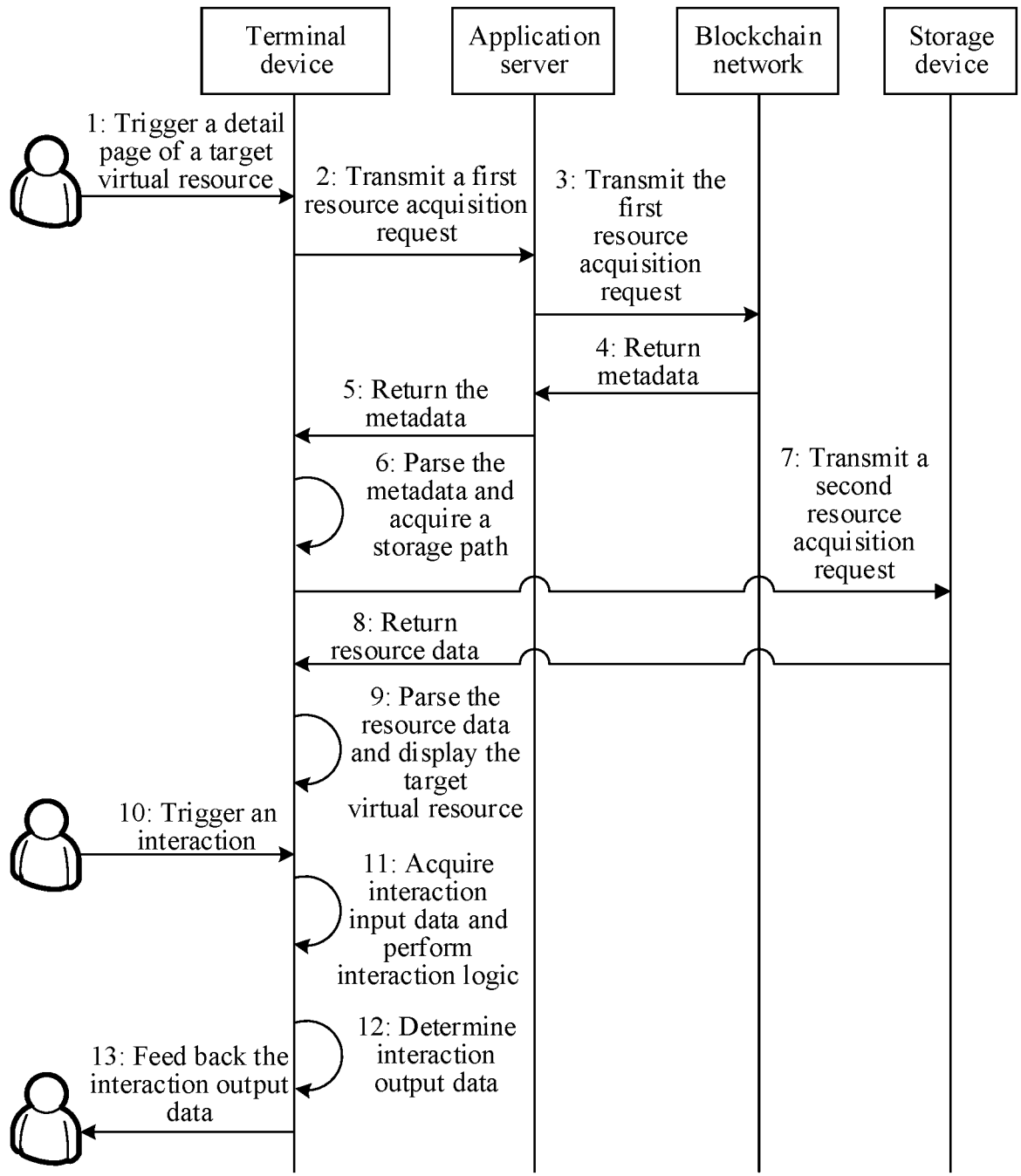
FIG. 8 is a flow schematic diagram of a blockchain-based data processing method provided by an example of the present subject matter.

The above-mentioned execution process takes the terminal device as an execution body, and the following takes the application server as an execution body. Referring to FIG. 8, it is an interactive schematic diagram of a blockchain-based data processing scene provided by an example of the present subject matter. A system between the terminal device and the application server may adopt a client/server (C/S) mode, and may also adopt a browser/server (B/S) mode. The data processing method includes step 1 to step 13. Step 1: The use object corresponding to the terminal device triggers a detail page of the target virtual resource in the terminal device. As illustrated in FIG. 2, the operation object 101c triggers the "confirm" control. Examples of the present subject matter also support the description above in FIG. 4, namely, the terminal device performs step 2 when the use object logs in to the digital asset application. Step 2: The terminal device transmits the first resource acquisition request to the application server. Step 3: The application server transmits the first resource acquisition request to the blockchain network. Step 4: The blockchain network returns the metadata. Step 5: The application server returns the metadata to the terminal device. Step 6: The terminal device parses the metadata and acquires the storage path. Step 7: The terminal device transmits the second resource acquisition request to the storage device according to the storage path. The storage device in examples of the present subject matter may be a cloud server, or a IPFS distribution. Step 8: The storage device returns the resource data to the terminal device. Step 9: The terminal device parses the resource data and displays the target virtual resource. Step 10: The use object triggers the interaction operation. Step 11: The terminal device acquires the interaction input data and performs the interaction logic. Step 12: The terminal device determines the interaction output data. Step 13: The terminal device feeds back the interaction output data to the use object. A specific implementation process of FIG. 8 may refer to the description above of examples corresponding to FIG. 2 and FIG. 4.

The core design of examples of the present subject matter is as follows. Human-computer interaction is introduced into a present mode of the digital asset application so that the target virtual resources have more operability and functional properties, not only limited to collection and appreciation.

It can be seen from the above that examples of the present subject matter may avoid storing the target virtual resource in the blockchain network by storing metadata corresponding to the target virtual resource and the target ticket identification in the blockchain network. Since an occupied space of the metadata is smaller than that of the target virtual resource, adopting examples of the present subject matter can not only save the storage space of the blockchain, but also improve the applicability of the blockchain to store data; therefore, when the target virtual resource has a large occupied space, the authenticity thereof may still be ensured through the blockchain network. Since the target virtual resource in examples of the present subject matter has both the asset property and the interaction property, by implementing the interaction operation with the target virtual resource, a presentation effect of the target virtual resource may be improved.

Figures 9, 10:
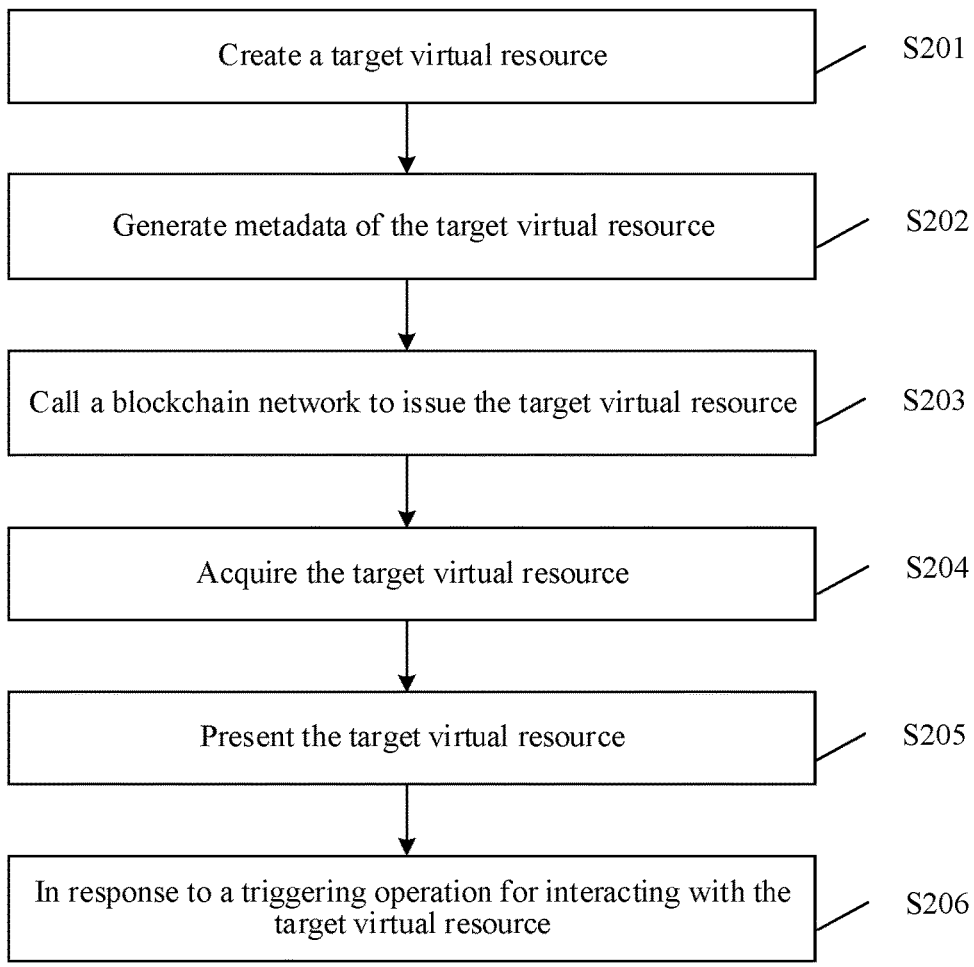
FIG. 9 is a flow schematic diagram of a blockchain-based data processing method provided by an example of the present subject matter.
FIG. 10 is a flow schematic diagram of a blockchain-based data processing method provided by an example of the present subject matter.

Further, referring to FIG. 9, it is a flow schematic diagram of a blockchain-based data processing method provided by an example of the present subject matter. The blockchain-based data processing method may be performed by the application server in FIG. 1, may also be performed by the terminal device in FIG. 1, and may also be interactively performed by the application server and the terminal device in FIG. 1. To facilitate understanding, examples of the present subject matter will be described by taking the terminal device performing the method as an example. As shown in FIG. 9, the blockchain-based data processing method may include at least the following step S201 to step S206.

Step S201: Create the target virtual resource.

Specifically, the terminal device may create the target virtual resource locally or may receive the target virtual resource from other devices.

Step S202: Generate the metadata corresponding to the target virtual resource.

Specifically, a name corresponding to the target virtual resource, a description text corresponding to the target virtual resource, and X pieces of property information corresponding to the target virtual resource are acquired, X is a positive integer. Resource basic information corresponding to the target virtual resource is generated according to the name, the description text, and the X pieces of property information. A resource storage request carrying the target virtual resource is transmitted to the storage device to make the storage device write the target virtual resource. A storage path for the target virtual resource returned by the storage device is acquired, and the metadata is generated according to the storage path and the resource basic information.

Referring to Table 1, it is a composition schematic table of the metadata provided by examples of the present subject matter.

TABLE 1

//Metadata
{
"name": "resource name",
"description": "resource description",

TABLE 1-continued

```
"http://xxxx.xxxx.xxx ": "storage path",
"attributes": [
{
"trait_type": "resource property type 1",
"value": "resource property value"
},
{
"trait_type": "resource property type 2",
"value": "resource property value"
},
{
"trait_type": "resource property type 3",
"value": "resource property value"
}
```

The resource name characterizes a name corresponding to the target virtual resource, such as the name "virtual resource 1" illustrated in FIG. 2. The resource description may characterize the description text corresponding to the target virtual resource and may include the interaction logic, the three-dimensional vertex coordinate, the target projection position, and the connection relationship between vertices corresponding to the target virtual resource, etc. The content of the description text may be set according to the practical application scene. In Table 1, the property information is exemplified by three resource properties. Assuming that the target virtual resource is a virtual pedestrian, and the resource property type 1 may be a gender, then the resource property value may be male or female. The resource property type 2 may be an age, and then the resource property value may be a child. The resource property type 3 may be a mood, and then the resource property value may be happy. It is to be understood that the above-mentioned description is merely to facilitate understanding, and does not represent that the target virtual resource has only three pieces of property information, and does not represent that the property information may only be the gender, age, and mood, and may be set according to the practical application scene.

Step S203: Call the blockchain network to issue the target virtual resource.

Specifically, a resource abstract corresponding to the target virtual resource is generated. A resource issue request is generated according to the metadata, the resource abstract, and the object identification, the resource issue request is transmitted to the blockchain network to make the blockchain network perform a consensus on the resource issue request, and the target ticket identification having a binding relationship with the resource issue request is created in a case that the consensus passes. The target ticket identification issued to the object identification returned by the blockchain network is acquired.

When creating the target virtual resource, the terminal device may uplink the hash value of the target virtual resource and a storage address (namely, the storage path) of the target virtual resource on the Internet. When the uplink is successful, the blockchain network may generate an on-chain digital asset and a ticket identification (namely, the target ticket identification) corresponding to the on-chain digital asset for the target virtual resource, add the target ticket identification to the ticket identification set corresponding to the object identification, and return same to the terminal device.

Step S204: Acquire the target virtual resource.

Specifically, the terminal device installed with the digital asset application logged in through the object identification may have a resource issue permission, as described in step S201 to step S203. In addition, resource acquisition permission may also be provided, for example, virtual resources issued by other object identifications may be acquired, or virtual resources held by other object identifications may be acquired, and target object identifications held by other object identifications may also be acquired (for example, other object identifications first acquire target virtual resources from this object identification, and then this object identification acquires target virtual resources from other object identifications).

Step S205: Present the target virtual resource.

Step S206: In response to the triggering operation for interacting with the target virtual resource.

Specifically, in conjunction with step S205 and step S206, the terminal device acquires the angular motion data through an angular motion detection component in the digital asset application logged in through the object identification in response to a triggering operation for performing motion interaction with the target virtual resource and synchronizes the angular motion data to the interaction distribution component. It is determined, in the interaction distribution component, that an interaction type corresponding to the angular motion data is the motion interaction type, and the angular motion data is synchronized to the physics engine component corresponding to the motion interaction type. A motion trajectory of the target virtual resource is outputted in the physics engine component according to the angular motion data.

The terminal device acquires the multimedia input data through a multimedia collection component in the digital asset application logged in through the object identification in response to a triggering operation for performing multimedia interaction with the target virtual resource. It is determined, through the interaction distribution component, that an interaction type corresponding to the multimedia input data is the multimedia interaction type, and the multimedia input data is synchronized to a multimedia control component corresponding to the multimedia interaction type. The multimedia output data corresponding to the multimedia input data is determined through the multimedia control component, and the multimedia output data is played in the target virtual resource.

It can be seen from the above that examples of the present subject matter may avoid storing the target virtual resource in the blockchain network by storing metadata corresponding to the target virtual resource and the target ticket identification in the blockchain network. Since the occupied space of the metadata is smaller than that of the target virtual resource, adopting examples of the present subject matter can not only save the storage space of the blockchain, but also improve the applicability of the blockchain to store data; therefore, when the target virtual resource has a large occupied space, the authenticity thereof may still be ensured through the blockchain network. Since the target virtual resource in examples of the present subject matter has both the asset property and the interaction property, by implementing the interaction operation with the target virtual resource, the presentation effect of the target virtual resource may be improved.

Further, referring to FIG. 10, it is a flow schematic diagram of a blockchain-based data processing method provided by an example of the present subject matter. The blockchain-based data processing method may be performed by the terminal device in FIG. 1, and may also be interactively performed by the application server and the terminal device in FIG. 1. To facilitate understanding, examples of the present subject matter will be described by taking the terminal device performing the method as an example. As shown in FIG. 10, the blockchain-based data processing method may include at least the following step S301 to step S302.

Step S301: The terminal device displays the target virtual resource in the digital asset application logged in through the object identification; the target virtual resource is obtained according to the metadata returned by the blockchain network; the metadata is acquired by the terminal device transmitting the first resource acquisition request for the target virtual resource to the blockchain network through the object identification; the first resource acquisition request is used for indicating the blockchain network, querying the target ticket identification associated with the object identification and the target virtual resource, and acquiring the metadata having a binding relationship with the target ticket identification; and the target ticket identification is used for characterizing that the object identification has ownership of the target virtual resource.

The specific implementation process of step S301 is described above referring to step S101 in the example corresponding to FIG. 4, and will not be described in detail here.

Step S302: Control the target virtual resource to perform the interaction output in response to the triggering operation for interacting with the target virtual resource.

Specifically, the target virtual resource includes a virtual role and Y direction controls having a binding relationship with the virtual role. The Y direction controls include a target direction control, Y is a positive integer. A motion trajectory to be confirmed is outputted for the virtual role in response to a triggering operation for activating a target area. The motion trajectory to be confirmed is generated based on the target area and an initial area for displaying the virtual role. The target area refers to an area other than the initial area in an interface for presenting the target virtual resource. The virtual role is controlled to move according to a confirmed motion trajectory in response to a triggering operation for confirming the motion trajectory to be confirmed. The virtual role is controlled to move according to a direction indicated by the target direction control in response to a triggering operation on the target direction control.

In an example, the target virtual resource includes the virtual role. An interaction suspended state of the virtual role is updated to an interaction activated state in response to a triggering operation for activating the virtual role. The virtual role is controlled to output feedback audio data during audio interaction in the interaction activated state in response to a triggering operation for performing the audio interaction with the virtual role.

The specific process of controlling the virtual role to output the feedback audio data during audio interaction may include: acquiring audio input data inputted for the virtual role in response to the triggering operation for performing the audio interaction with the virtual role, and acquiring position information and environment information; inputting both the position information and the environment information into audio interaction logic, and determining feedback audio data associated with the position information and the environment information through the audio interaction logic; and controlling the virtual role to play the feedback audio data.

Figure 11:
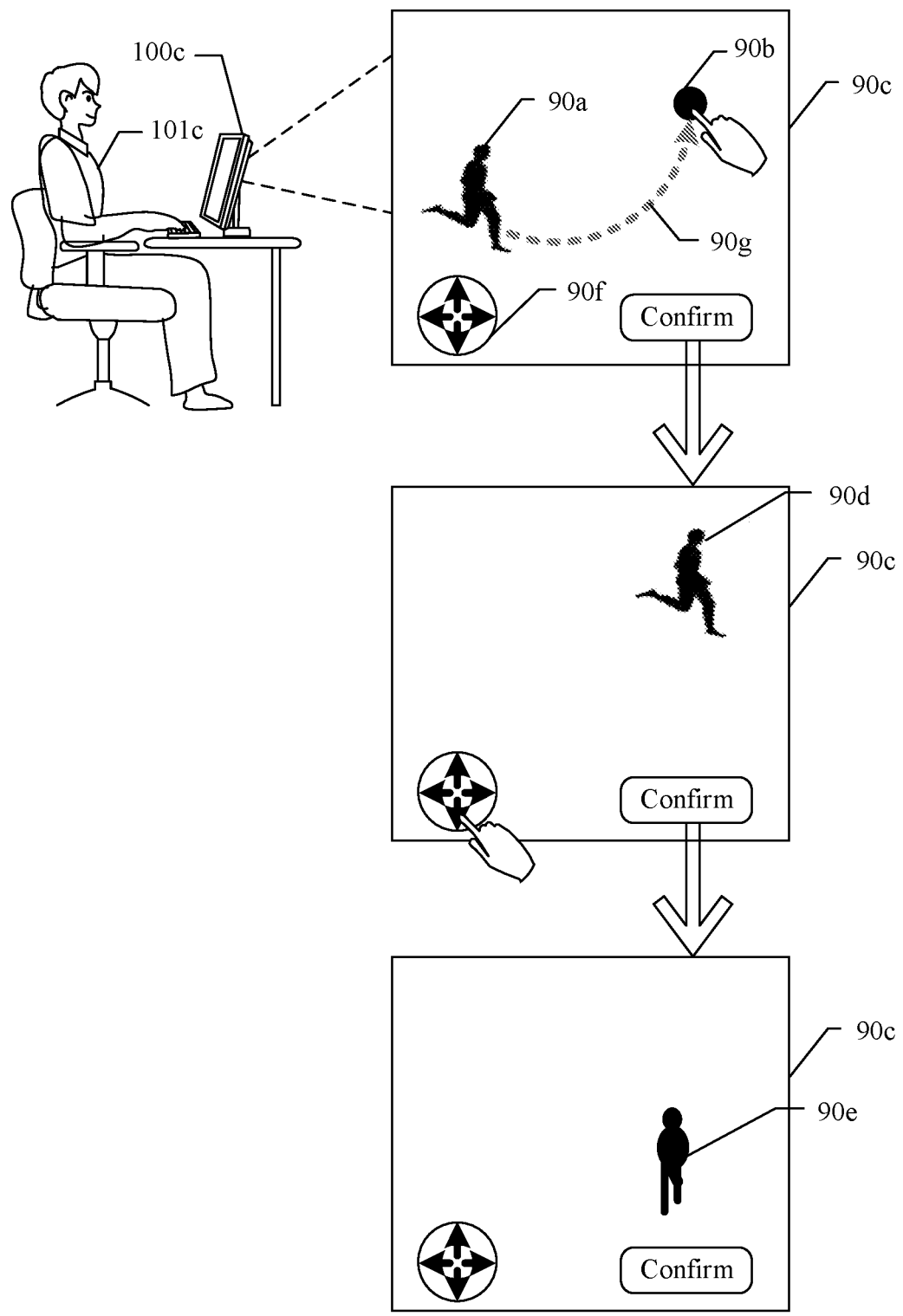
FIG. 11 is a schematic diagram of a blockchain-based data processing scene provided by an example of the present subject matter.

The target virtual resource may include the virtual role and the direction control for controlling the virtual role to perform the interaction operation. Referring to FIG. 11, it is a schematic diagram of a blockchain-based data processing scene provided by an example of the present subject matter. As shown in FIG. 11, after logging in to a digital asset application 90*c* installed by the terminal device 100*c* through the object identification, the operation object 101*c* may view the target virtual resource of which the object identification has ownership in the blockchain network, a virtual role 90*a* and Y direction controls 90*f* having a binding relationship with the virtual role 90*a* as illustrated in FIG. 11. If the screen corresponding to the terminal device 100*a* is taken as a reference, the Y direction controls 90*f* in FIG. 11 may include four direction controls: an up control, a down control, a left control, and a right control.

If the operation object 101*c* selects a target area 90*b* as the next presentation position of the virtual role 90*a* in the interface presenting the target virtual resource, the terminal device 100*c* may output a motion trajectory to be confirmed 90*g* for the virtual role 90*a* in response to a triggering operation for activating the target area 90*b*. The motion trajectory to be confirmed 90*g* takes the initial area of the virtual role 90*a* as a starting presentation position and takes the target area as a target presentation position. When the operation object 101*c* triggers the "confirm" control, the terminal device 100*c* controls the virtual role 90*a* to move according to a confirmed motion trajectory (at this moment, equivalent to the motion trajectory to be confirmed 90*g*) in response to the triggering operation for confirming the motion trajectory to be confirmed 90*g* so that a virtual role 90*d* may be obtained.

Subsequently, if the operation object 101*c* selects the down control, the terminal device 100*c* determines the down control as the target direction control. When the operation object 101*c* triggers the "confirm" control, the terminal device 100*c* may control the virtual role 90*d* to move in a downward direction so that a virtual role 90*e* may be obtained. In an example, the virtual role 90*a*, the virtual role 90*d*, and the virtual role 90*e* all represent the same virtual resource, differing only in different expressions.

Figure 12:
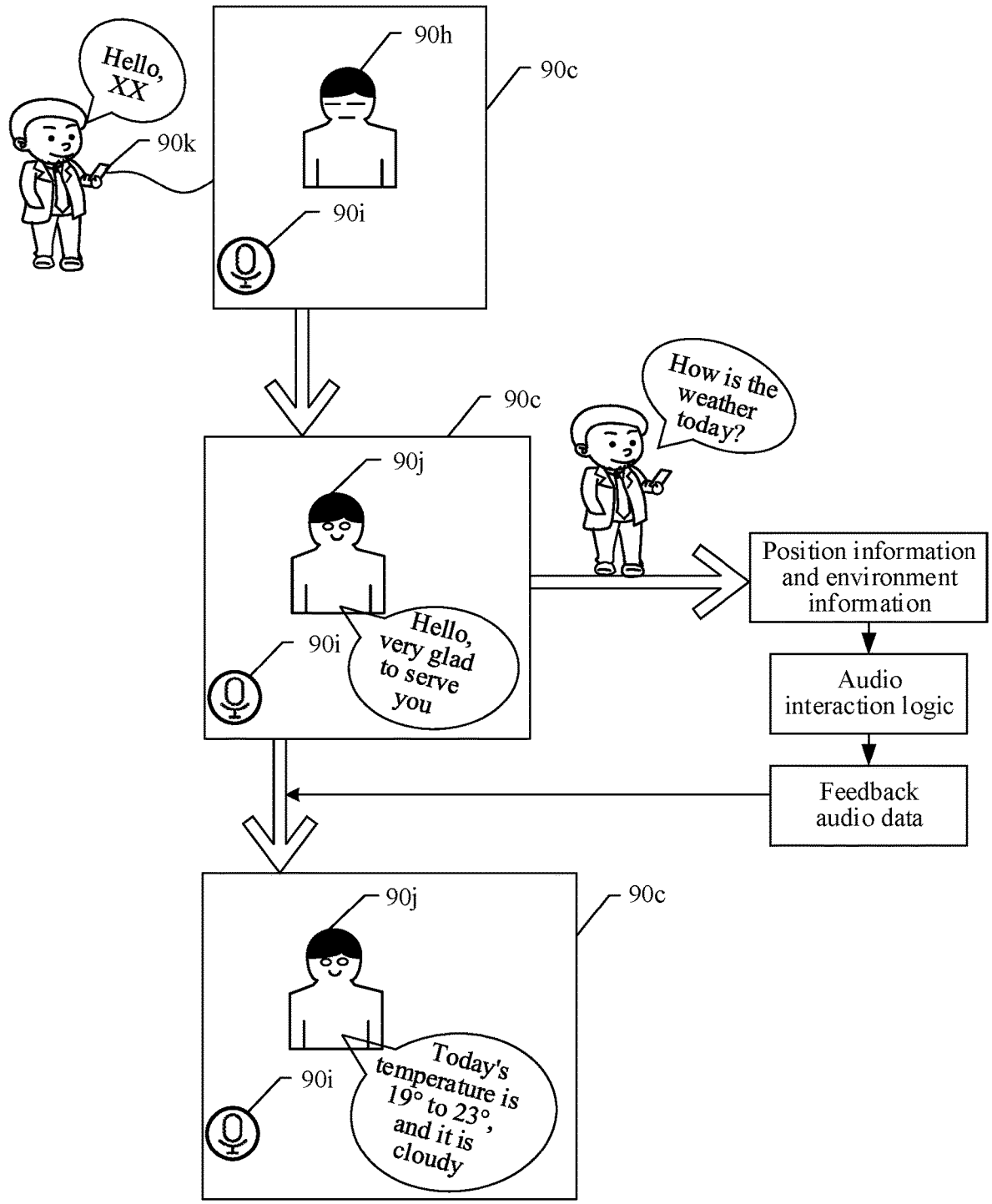
FIG. 12 is a schematic diagram of a blockchain-based data processing scene provided by an example of the present subject matter.

In another implementation, referring to FIG. 12, it is a schematic diagram of a blockchain-based data processing scene provided by an example of the present subject matter. As shown in FIG. 12, the target virtual resource may include a virtual role 90*h* and a voice control 90*i* having a binding relationship with the virtual role 90*h*, and the voice control 90*i* may have the pickup function and the broadcasting function. After a use object corresponding to a terminal device 90*k* logs in to a digital asset application 90*c* installed by the terminal device 90*k* through the object identification, the target virtual resource having ownership of the object identification in the blockchain network may be viewed in the digital asset application 90*c*, such as the virtual role 90*h* and the voice control 90*i* in FIG. 12. If the use object performs a triggering operation for performing audio interaction with the virtual role 90*h*, and if the use object inputs a voice "Hello, XX", the terminal device 90*k* may update an interaction suspended state of the virtual role 90*h* to the interaction activated state in response to a triggering operation for activating the virtual role 90*h*. As shown by a virtual role 90*j*, at this moment, the terminal device 90*k* may output a voice "Hello, very glad to serve you" through the voice control 90*i*. In the interaction activated state, the use object may perform the audio interaction with the virtual role 90*j* through the voice control 90*i*. As shown in FIG. 12, the use object queries the virtual role 90*j* about how is the weather today through the voice control 90*i*. The terminal device 90*k* may acquire the audio input data inputted for the virtual role, namely, the voice "How the weather is today", in response to the triggering operation for performing the audio interaction with the virtual role. Since the use object queries the weather, the terminal device 90k may acquire the position information and the environment information. Further, both the position information and the environment information are inputted into the audio interaction logic, and the feedback audio data associated with the position information and the environment information are determined through the audio interaction logic. Further, the terminal device 90k controls the virtual role 90j to play the feedback audio data. As shown in FIG. 12, the virtual role 90j plays "Today's temperature 19° to 23°, cloudy" through the voice control 90i.

In an example, interaction forms involved in FIG. 2, FIG. 3, FIG. 9, and FIG. 10 may be combined according to the actual situation to form a rich interaction way. In addition, the interaction ways may also be set according to features of different terminal devices, for example, on a mobile terminal (such as a mobile phone), the angular motion detection component (such as a gyroscope), a position sensor (such as a locating component), a temperature sensor (such as a thermometer) may be combined, and the angular motion data, a geographic position, a temperature, and other variables may be used as the interaction input data. Examples of the present subject matter may perform multiple types of interactions regarding gravity, position, direction, temperature, etc. with the help of the actual situation of the mobile device in the geographic position. In a device (such as a VR helmet/glasses) with the help of virtual reality (VR) technology, the digital asset application may fuse the target virtual resource and environment information in a projection scene, and then interact with the use object corresponding to the terminal device. For example, one target virtual resource is superimposed in one real environment through augmented reality glasses. For example, if there is a table in the real environment, the target virtual resource may be automatically attached to the table. If the use object reaches out, the target virtual resource may be placed on the hand of the use object.

It can be seen from the above that examples of the present subject matter may avoid storing the target virtual resource in the blockchain network by storing metadata corresponding to the target virtual resource and the target ticket identification in the blockchain network. Since the occupied space of the metadata is smaller than that of the target virtual resource, adopting examples of the present subject matter can not only save the storage space of the blockchain, but also improve the applicability of the blockchain to store data; therefore, when the target virtual resource has a large occupied space, the authenticity thereof may still be ensured through the blockchain network. Since the target virtual resource in examples of the present subject matter has both the asset property and the interaction property, by implementing the interaction operation with the target virtual resource, the presentation effect of the target virtual resource may be improved.

Figure 13:
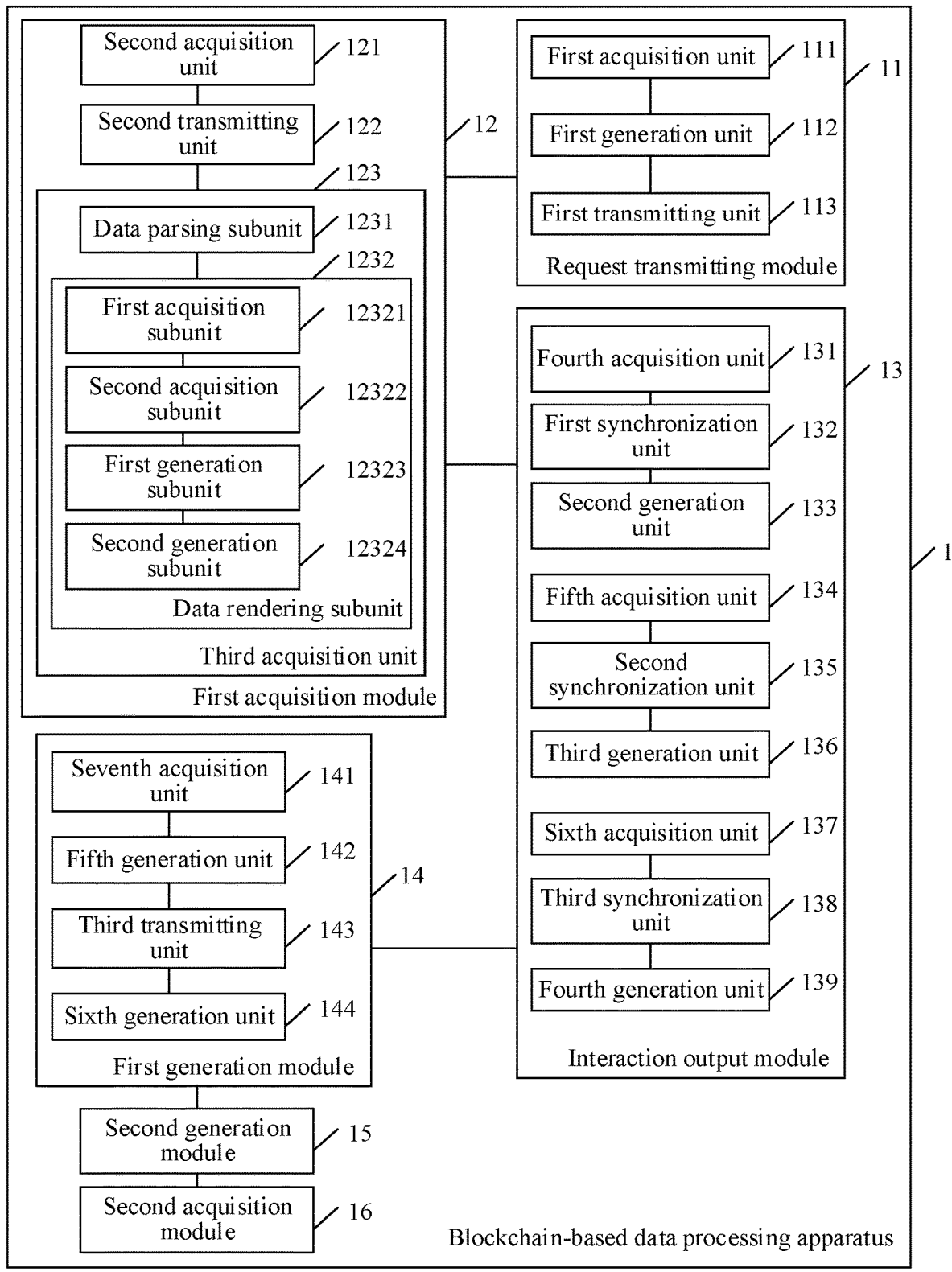
FIG. 13 is a schematic structural diagram of a blockchain-based data processing apparatus provided by an example of the present subject matter.

Further, referring to FIG. 13, it is a schematic structural diagram of a blockchain-based data processing apparatus provided by an example of the present subject matter. The blockchain-based data processing apparatus may be a computer program (including a program code) running in the computer device. For example, the blockchain-based data processing apparatus is an application software, and may also be a hardware component constituting the computer device. The apparatus may be configured to perform respective steps in methods provided by examples of the present subject matter. As shown in FIG. 13, a blockchain-based data processing apparatus 1 may include: a request transmitting module 11, a first acquisition module 12, and an interaction output module 13.

The request transmitting module 11 is configured to transmit the first resource acquisition request of the object identification for the target virtual resource to the blockchain network to make the blockchain network query the target ticket identification associated with the object identification and the target virtual resource based on the first resource acquisition request, and acquire the metadata having the binding relationship with the target ticket identification, the target ticket identification is used for characterizing that the object identification has ownership of the target virtual resource.

The first acquisition module 12 is configured to acquire the target virtual resource according to the metadata returned by the blockchain network.

The interaction output module 13 is configured to control the target virtual resource to perform the interaction output in response to the triggering operation for interacting with the target virtual resource.

The implementation of specific functions of the request transmitting module 11, the first acquisition module 12, and the interaction output module 13 may refer to step S101 to step S103 in the corresponding example of the above-mentioned FIG. 3, and will not be described in detail here.

Referring again to FIG. 13, the request transmitting module 11 may include: a first acquisition unit 111, a first generation unit 112, and a first transmitting unit 113.

The first acquisition unit 111 is configured to acquire the ticket identification to be verified for the target virtual resource in response to the resource acquisition instruction in the digital asset application logged in through the object identification.

The first generation unit 112 is configured to generate the first resource acquisition request according to the ticket identification to be verified and the object identification, and sign the first resource acquisition request to obtain the signature information.

The first transmitting unit 113 is configured to transmit the first resource acquisition request carrying the signature information to the blockchain network. The signature information is used for indicating validity of the blockchain network verifying the object identification. The object identification is used for indicating the blockchain network to acquire a ticket identification set having a binding relationship with the object identification in a case that determining the object identification having a legal permission. The ticket identification set includes the target ticket identification. The ticket identification to be verified is used for indicating the blockchain network to determine a holding permission of the object identification for the target virtual resource according to the ticket identification set. The holding permission is used for characterizing that the ticket identification to be verified is the same as the target ticket identification.

The implementation of specific functions of the first acquisition unit 111, the first generation unit 112, and the first transmitting unit 113 may refer to step S101 in the above-mentioned example corresponding to FIG. 3, and will not be described in detail here.

Referring again to FIG. 13, the first acquisition module 12 may include: a second acquisition unit 121, a second transmitting unit 122, and a third acquisition unit 123.

The second acquisition unit 121 is configured to acquire the metadata transmitted by the blockchain network in the digital asset application logged in through the object identification.

The second transmitting unit 122 is configured to parse the metadata to acquire the storage path corresponding to the target virtual resource, and transmit the second resource acquisition request to the storage device corresponding to the storage path.

The third acquisition unit 123 is configured to acquire the resource data for the target virtual resource returned by the storage device, and display the target virtual resource according to the resource data.

The implementation of specific functions of the second acquisition unit 121, the second transmitting unit 122, and the third acquisition unit 123 may refer to step S102 in the corresponding example of the above-mentioned FIG. 3, and will not be described in detail here.

Referring again to FIG. 13, the third acquisition unit 123 may include: a data parsing subunit 1231 and a data rendering subunit 1232.

The data parsing subunit 1231 is configured to parse the resource data to acquire the resource data to be rendered.

The data rendering subunit 1232 is configured to call the physics engine, and render the resource data to be rendered through the rendering pipeline in the physics engine to obtain the target virtual resource for displaying in the presentation interface.

The implementation of specific functions of the data parsing subunit 1231 and the data rendering subunit 1232 may refer to step S102 in the corresponding example of the above-mentioned FIG. 3, and will not be described in detail here.

Referring again to FIG. 13, the data rendering subunit 1232 may include: a first acquisition subunit 12321, a second acquisition subunit 12322, a first generation subunit 12323, and a second generation subunit 12324.

The first acquisition subunit 12321 is configured to acquire the three-dimensional vertex coordinate of the vertex of the target virtual resource in the three-dimensional space in the resource data to be rendered.

The second acquisition subunit 12322 is configured to acquire the target projection position, call the vertex shader, and map the three-dimensional vertex coordinate to the two-dimensional space according to the target projection position to obtain the two-dimensional vertex coordinate of the vertex of the target virtual resource under the target projection position.

The first generation subunit 12323 is configured to draw the two-dimensional line corresponding to the two-dimensional vertex coordinate and the two-dimensional plane generated by the two-dimensional line in the two-dimensional space according to the connection relationship between the vertices of the target virtual resource.

The second generation subunit 12324 is configured to display the target virtual resource under the target projection position in the presentation interface according to the two-dimensional line and the two-dimensional plane.

The implementation of specific functions of the first acquisition subunit 12321, the second acquisition subunit 12322, the first generation subunit 12323, and the second generation subunit 12324 may refer to step S102 in the corresponding example of the above-mentioned FIG. 3, and will not be described in detail here.

Referring again to FIG. 13, the data to be rendered includes the target color corresponding to the target virtual resource.

The second generation subunit 12324 is specifically configured to determine the geometric primitive of the target virtual resource in the two-dimensional space according to the two-dimensional line and the two-dimensional plane.

The second generation subunit 12324 is also specifically configured to rasterize the geometric primitive to acquire the fragment to be shaded including the target virtual resource displayed in the target projection position.

The second generation subunit 12324 is also specifically configured to render the target virtual resource in the fragment to be shaded through the fragment shader, and display the target virtual resource having the target color in the presentation interface based on the rendering result.

The implementation of specific functions of the second generation subunit 12324 may refer to step S102 in the corresponding example of the above-mentioned FIG. 3, and will not be described in detail here.

Referring again to FIG. 13, the interaction output module 13 may include: a fourth acquisition unit 131, a first synchronization unit 132, and a second generation unit 133.

The fourth acquisition unit 131 is configured to acquire the interaction input data in the digital asset application logged in through the object identification in response to the triggering operation for interacting with the target virtual resource.

The first synchronization unit 132 is configured to determine the interaction type corresponding to the interaction input data through the interaction distribution component, and synchronize the interaction input data to the data processing component corresponding to the interaction type.

The second generation unit 133 is configured to perform the interaction logic in the data processing component according to the interaction input data to obtain the interaction output data.

The second generation unit 133 is also configured to output the interaction output data in the target virtual resource.

The implementation of specific functions of the fourth acquisition unit 131, the first synchronization unit 132, and the second generation unit 133 may refer to step S103 in the corresponding example of the above-mentioned FIG. 3, and will not be described in detail here.

Referring again to FIG. 13, the interaction output module 13 may include: a fifth acquisition unit 134, a second synchronization unit 135, and a third generation unit 136.

The fifth acquisition unit 134 is configured to acquire the angular motion data through the angular motion detection component in the digital asset application logged in through the object identification in response to the triggering operation for performing the motion interaction with the target virtual resource, and synchronize the angular motion data to the interaction distribution component.

The second synchronization unit 135 is configured to determine, in the interaction distribution component, that the interaction type corresponding to the angular motion data is the motion interaction type, and synchronize the angular motion data to the physics engine component corresponding to the motion interaction type.

The third generation unit 136 is configured to output the motion trajectory of the target virtual resource in the physics engine component according to the angular motion data.

The implementation of specific functions of the fifth acquisition unit 134, the second synchronization unit 135, and the third generation unit 136 may refer to step S103 in the corresponding example of the above-mentioned FIG. 3, and will not be described in detail here.

Referring again to FIG. 13, the interaction output module 13 may include: a sixth acquisition unit 137, a third synchronization unit 138, and a fourth generation unit 139.

The sixth acquisition unit 137 is configured to acquire the multimedia input data through the multimedia collection component in the digital asset application logged in through the object identification in response to the triggering operation for performing the multimedia interaction with the target virtual resource.

The third synchronization unit 138 is configured to determine, through the interaction distribution component, that the interaction type corresponding to the multimedia input data is a multimedia interaction type, and synchronize the multimedia input data to the multimedia control component corresponding to the multimedia interaction type.

The fourth generation unit 139 is configured to determine the multimedia output data corresponding to the multimedia input data through the multimedia control component, and play the multimedia output data in the target virtual resource.

The implementation of specific functions of the sixth acquisition unit 137, the third synchronization unit 138, and the fourth generation unit 139 may refer to step S103 in the corresponding example of the above-mentioned FIG. 3, and will not be described in detail here.

Referring again to FIG. 13, the blockchain-based data processing apparatus 1 may also include: a first generation module 14, a second generation module 15, and a second acquisition module 16.

The first generation module 14 is configured to create the target virtual resource, generate the metadata corresponding to the target virtual resource, and generate the resource abstract corresponding to the target virtual resource.

The second generation module 15 is configured to generate the resource issue request according to the metadata, the resource abstract, and the object identification, transmit the resource issue request to the blockchain network to make the blockchain network perform the consensus on the resource issue request, and create the target ticket identification having the binding relationship with the resource issue request in a case that the consensus passes.

The second acquisition module 16 is configured to acquire the target ticket identification issued to the object identification returned by the blockchain network.

The implementation of specific functions of the first generation module 14, the second generation module 15, and the second acquisition module 16 may refer to step S201 to step S203 in the corresponding example of the above-mentioned FIG. 9, and will not be described in detail here.

Referring again to FIG. 13, the first generation module 14 may include: a seventh acquisition unit 141, a fifth generation unit 142, a third transmitting unit 143, and a sixth generation unit 144.

The seventh acquisition unit 141 is configured to acquire the name corresponding to the target virtual resource, the description text corresponding to the target virtual resource, and the X pieces of property information corresponding to the target virtual resource, X is a positive integer.

The fifth generation unit 142 is configured to generate the resource basic information corresponding to the target virtual resource according to the name, the description text, and the X pieces of property information.

The third transmitting unit 143 is configured to transmit the resource storage request carrying the target virtual resource to the storage device to make the storage device write the target virtual resource.

The sixth generation unit 144 is configured to acquire the storage path for the target virtual resource returned by the storage device, and generate the metadata according to the storage path and the resource basic information.

The implementation of specific functions of the seventh acquisition unit 141, the fifth generation unit 142, the third transmitting unit 143, and the sixth generation unit 144 may refer to step S202 in the corresponding example of the above-mentioned FIG. 9, and will not be described in detail here.

It can be seen from the above that examples of the present subject matter may avoid storing the target virtual resource in the blockchain network by storing metadata corresponding to the target virtual resource and the target ticket identification in the blockchain network. Since the occupied space of the metadata is smaller than that of the target virtual resource, adopting examples of the present subject matter can not only save the storage space of the blockchain, but also improve the applicability of the blockchain to store data; therefore, when the target virtual resource has a large occupied space, the authenticity thereof may still be ensured through the blockchain network. Since the target virtual resource in examples of the present subject matter has both the asset property and the interaction property, by implementing the interaction operation with the target virtual resource, the presentation effect of the target virtual resource may be improved.

Figure 14:
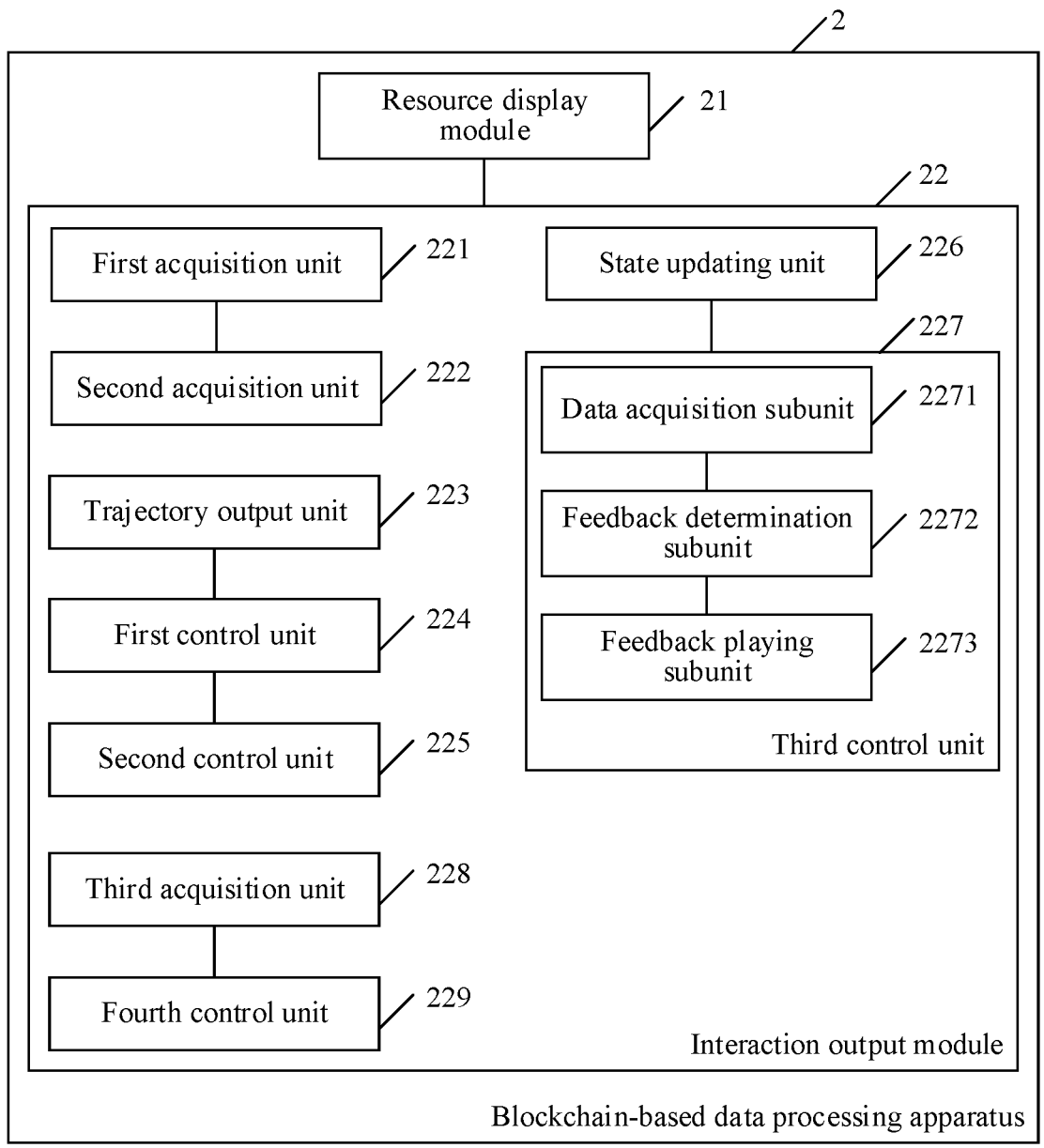
FIG. 14 is a schematic structural diagram of a blockchain-based data processing apparatus provided by an example of the present subject matter.

Further, referring to FIG. 14, it is a schematic structural diagram of a blockchain-based data processing apparatus provided by an example of the present subject matter. The blockchain-based data processing apparatus may be a computer program (including the program code) running in the computer device. For example, the data processing apparatus is an application software, and may also be the hardware component constituting the computer device. The apparatus may be configured to perform respective steps in methods provided by examples of the present subject matter. As shown in FIG. 14, the data processing device 2 may run in the terminal device, and the terminal device may be the terminal device in the corresponding example of the above-mentioned FIG. 3. The blockchain-based data processing apparatus 2 may include: a resource display module 21 and an interaction output module 22.

The resource display module 21 is configured to display the target virtual resource in the digital asset application logged in through the object identification. The target virtual resource is obtained according to the metadata returned by the blockchain network. The metadata is acquired by the terminal device transmitting the first resource acquisition request for the target virtual resource to the blockchain network through the object identification. The first resource acquisition request is used for indicating the blockchain network, querying the target ticket identification associated with the object identification and the target virtual resource, and acquiring the metadata having a binding relationship with the target ticket identification. The target ticket identification is used for characterizing that the object identification has ownership of the target virtual resource.

The interaction output module 22 is configured to control the target virtual resource to perform the interaction output in response to the triggering operation for interacting with the target virtual resource.

The implementation of specific functions of the resource display module 21 and the interaction output module 22 may refer to step S301 to step S302 in the corresponding example of the above-mentioned FIG. 10, and will not be described in detail here.

Referring again to FIG. 14, the target virtual resource includes the three-dimensional model.

The interaction output module 22 may also include: a first acquisition unit 221 and a second acquisition unit 222.

The first acquisition unit 221 is configured to acquire the rotation indication direction in response to the triggering operation for rotating the three-dimensional model, and control the three-dimensional model to rotate according to the rotation indication direction.

The second acquisition unit 222 is configured to acquire the scaling ratio in response to the triggering operation for scaling the three-dimensional model, and control the three-dimensional model to scale according to the scaling ratio.

The implementation of specific functions of the first acquisition unit 221 and the second acquisition unit 222 may refer to the description in the corresponding example of the above-mentioned FIG. 2, and will not be described in detail here.

Referring again to FIG. 14, the target virtual resource includes the virtual role and the Y direction controls having the binding relationship with the virtual role. The Y direction controls include the target direction control, Y is a positive integer.

The interaction output module 22 may also include: a trajectory output unit 223, a first control unit 224, and a second control unit 225.

The trajectory output unit 223 is configured to output the motion trajectory to be confirmed for the virtual role in response to the triggering operation for activating the target area. The motion trajectory to be confirmed is generated based on the target area and the initial area for displaying the virtual role. The target area refers to the area other than the initial area in the interface for presenting the target virtual resource.

The first control unit 224 is configured to control the virtual role to move according to the confirmed motion trajectory in response to the triggering operation for confirming the motion trajectory to be confirmed.

The second control unit 225 is configured to control the virtual role to move according to the direction indicated by the target direction control in response to the triggering operation on the target direction control.

The implementation of specific functions of the trajectory output unit 223, the first control unit 224, and the second control unit 225 may refer to step S302 in the corresponding example of the above-mentioned FIG. 10, and will not be described in detail here.

Referring again to FIG. 14, the target virtual resource includes the virtual role.

The interaction output module 22 may also include: a state updating unit 226 and a third control unit 227.

The state updating unit 226 is configured to update the interaction suspended state of the virtual role to the interaction activated state in response to the triggering operation for activating the virtual role.

The third control unit 227 is configured to control the virtual role to output the feedback audio data during the audio interaction in the interaction activated state in response to the triggering operation for performing the audio interaction with the virtual role.

The implementation of specific functions of the state updating unit 226 and the third control unit 227 may refer to step S302 in the corresponding example of the above-mentioned FIG. 10, and will not be described in detail here.

Referring again to FIG. 14, the third control unit 227 includes: a data acquisition subunit 2271, a feedback determination subunit 2272, and a feedback playing subunit 2273.

The data acquisition subunit 2271 is configured to acquire the audio input data inputted for the virtual role in response to the triggering operation for performing the audio interaction with the virtual role, and acquire the position information and the environment information.

The feedback determination subunit 2272 is configured to input both the position information and the environment information into the audio interaction logic, and determine the feedback audio data associated with the position information and the environment information through the audio interaction logic.

The feedback playing subunit 2273 is configured to control the virtual role to play the feedback audio data.

The implementation of specific functions of the data acquisition subunit 2271, the feedback determination subunit 2272, and the feedback playing subunit 2273 may refer to step S302 in the corresponding example of the above-mentioned FIG. 10, and will not be described in detail here.

Referring again to FIG. 14, the target virtual resource includes the Z audio data playing controls. The Z audio data playing controls include the first audio data playing control and the second audio data playing control, Z is a positive integer greater than 1.

The interaction output module 22 may include: a third acquisition unit 228 and a fourth control unit 229.

The third acquisition unit 228 is configured to acquire the first audio data corresponding to the first audio data playing control in response to the triggering operation on the first audio data playing control at the first moment.

The third acquisition unit 228 is further configured to acquire the second audio data corresponding to the second audio data playing control in response to the triggering operation on the second audio data playing control at the second moment. The second moment is later than the first moment, and the time interval between the second moment and the first moment is less than the duration threshold.

The fourth control unit 229 is configured to control the target virtual resource to play the first audio data and the second audio data in sequence in a case that there is no response to the triggering operation on the Z audio data playing controls at the third moment. The third moment is later than the second moment, and the time interval between the third moment and the second moment is greater than or equal to the duration threshold.

The implementation of the specific functions of the third acquisition unit 228 and the fourth control unit 229 may refer to step S103 in the corresponding example of the above-mentioned FIG. 3, and will not be described in detail here.

It can be seen from the above that examples of the present subject matter may avoid storing the target virtual resource in the blockchain network by storing metadata corresponding to the target virtual resource and the target ticket identification in the blockchain network. Since the occupied space of the metadata is smaller than that of the target virtual resource, adopting examples of the present subject matter can not only save the storage space of the blockchain, but also improve the applicability of the blockchain to store data; therefore, when the target virtual resource has a large occupied space, the authenticity thereof may still be ensured through the blockchain network. Since the target virtual resource in examples of the present subject matter has both the asset property and the interaction property, by implementing the interaction operation with the target virtual resource, the presentation effect of the target virtual resource may be improved.

Figure 15:
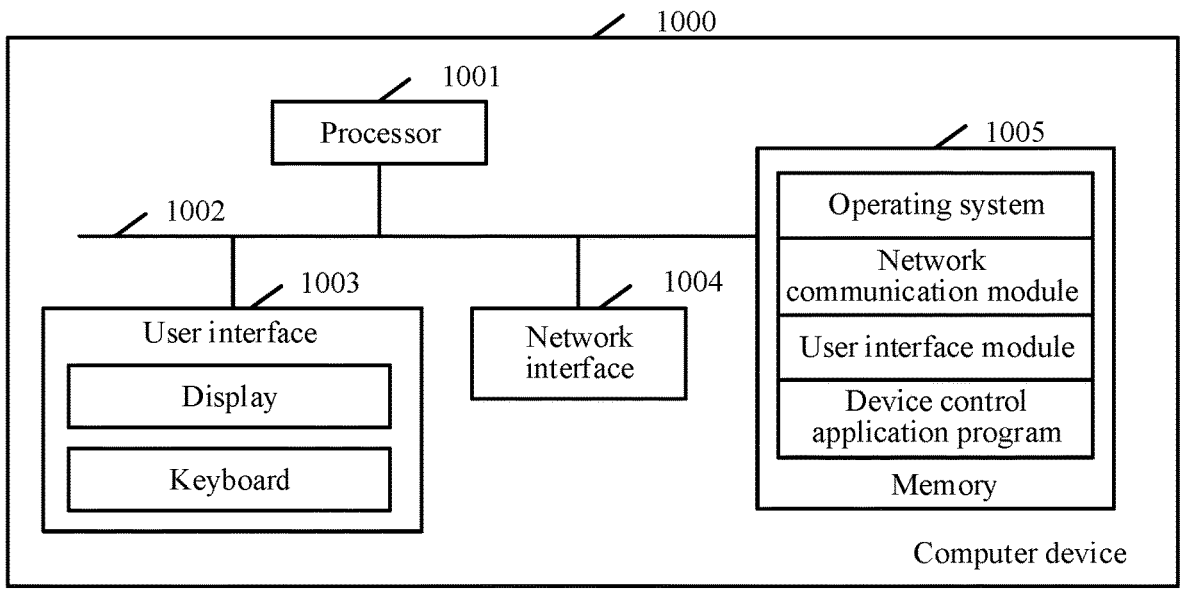
FIG. 15 is a schematic structural diagram of a computer device provided by an example of the present subject matter.

Further, referring to FIG. 15, it is a schematic structural diagram of a computer device provided by an example of the present subject matter. As shown in FIG. 15, the computer device 1000 may include: at least one processor 1001 (such as a CPU), at least one network interface 1004, a user interface 1003, a memory 1005, and at least one communication bus 1002. The communication bus 1002 is configured to implement communication of connections between these components. The user interface 1003 may include a display and a keyboard. The network interface 1004 may include a standard wired interface and a wireless interface (such as a WI-FI interface). The memory 1005 may be a high-speed RAM memory or a non-volatile memory, such as at least one magnetic disk memory. The memory 1005 may also be at least one storage apparatus located away from the aforementioned processor 1001. As shown in FIG. 15, the memory 1005, as a non-transitory computer storage medium, may include an operating system, a network communication module, a user interface module, and a device control application program.

In the computer device 1000 shown in FIG. 15, the network interface 1004 may provide a network communication function. However, the user interface 1003 is mainly configured to provide an interface for the user to input. The processor 1001 may be configured to call the device control application program stored in the memory 1005 to implement the blockchain-based data processing method described in the above-mentioned examples.

The computer device 1000 described in examples of the present subject matter may perform the steps of the blockchain-based data processing method in the examples corresponding to the above-mentioned FIG. 3, FIG. 9, and FIG. 10, and may also perform the functions of the blockchain-based data processing apparatus 1 in the example corresponding to the above-mentioned FIG. 13, which will not be described in detail here. In addition, the description of beneficial effects of the same method are not described herein again.

Figure 16:
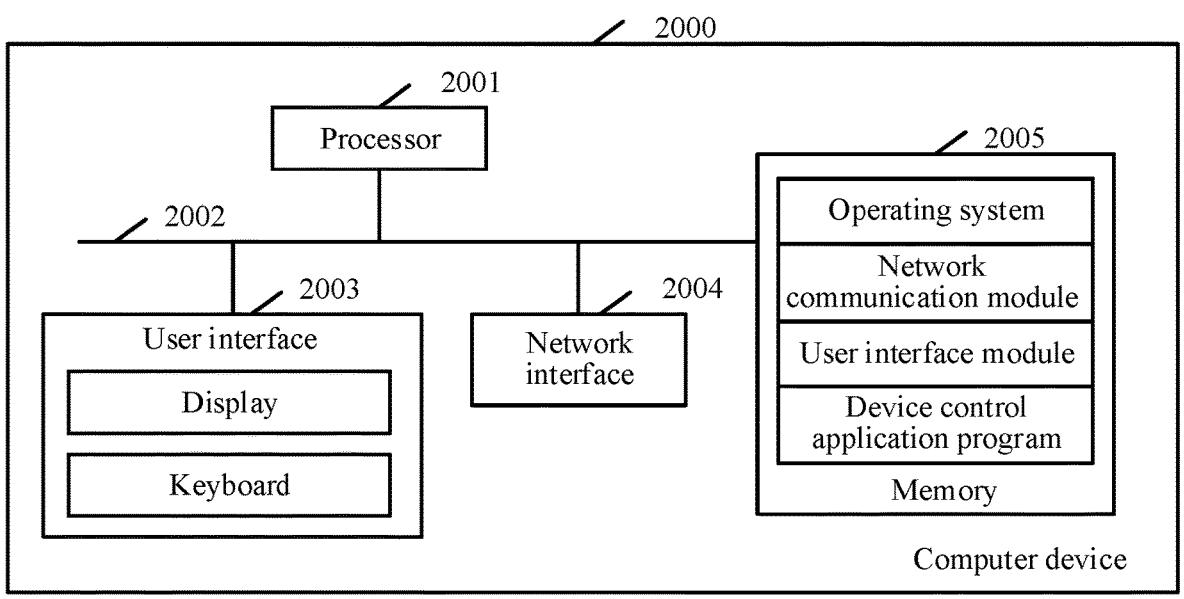
FIG. 16 is a schematic structural diagram of a computer device provided by an example of the present subject matter.

Further, referring to FIG. 16, it is a schematic structural diagram of a computer device provided by an example of the present subject matter. As shown in FIG. 16, the computer device 2000 may be a terminal device in the corresponding example of the above-mentioned FIG. 3, and the computer device 2000 may include: a processor 2001, a network interface 2004, and a memory 2005. In addition, the computer device 2000 may also include: a user interface 2003 and at least one communication bus 2002. The communication bus 2002 is configured to implement communication of connections between these components. The user interface 2003 may include the display, the keyboard, the standard wired interface, and the wireless interface. The network interface 2004 may include the standard wired interface and the wireless interface (such as the WI-FI interface). The memory 2005 may be the high-speed RAM memory or the non-volatile memory, such as at least one magnetic disk memory. The memory 2005 may also be at least one storage apparatus located away from the aforementioned processor 2001. As shown in FIG. 16, the memory 2005, as a non-transitory computer-readable storage medium, may include the operating system, the network communication module, the user interface module, and the device control application program.

The term module (and other similar terms such as unit, subunit, submodule, etc.) in the present disclosure may refer to a software module, a hardware module, or a combination thereof. Modules implemented by software are stored in memory or non-transitory computer-readable medium. The software modules, which include computer instructions or computer code, stored in the memory or medium can run on a processor or circuitry (e.g., ASIC, PLA, DSP, FPGA, or other integrated circuit) capable of executing computer instructions or computer code. A hardware module may be implemented using one or more processors or circuitry. A processor or circuitry can be used to implement one or more hardware modules. Each module can be part of an overall module that includes the functionalities of the module. Modules can be combined, integrated, separated, and/or duplicated to support various applications. Also, a function is performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices and stored in memory or non-transitory computer readable medium.

In the computer device 2000 shown in FIG. 16, the network interface 2004 may provide the network communication function. The user interface 2003 is mainly configured to provide the interface for the user to input. The processor 2001 may be configured to call the device control application program stored in the memory 2005 to implement the blockchain-based data processing method described in the above-mentioned examples.

The computer device 2000 described in examples of the present subject matter may perform the steps of the blockchain-based data processing method in the examples corresponding to the above-mentioned FIG. 3, FIG. 6, FIG. 7, and FIG. 8, and may also perform the functions of the blockchain-based data processing apparatus 2 in the example corresponding to the above-mentioned FIG. 14, which will not be described in detail here. In addition, the description of beneficial effects of the same method are not described herein again.

Examples of the present subject matter also provide a non-transitory computer-readable storage medium storing a computer program including program instructions which, when executed by a processor, implement the blockchain-based data processing method provided by the various steps of FIG. 3, FIG. 9, and FIG. 10, which may be specifically referred to the above-mentioned implementation provided by the various steps of FIG. 3, FIG. 9, and FIG. 10, and will not be described in detail here. In addition, the description of beneficial effects of the same method are not described herein again.

The non-transitory computer-readable storage medium may be a blockchain-based data processing apparatus provided by any of the above-mentioned examples or an internal storage unit of the above-mentioned computer device, such as a hard disk or a memory of the computer device. The non-transitory computer-readable storage medium may also be an external storage device of the computer device, such as a plug-in hard disk, a smart media card (SMC), a secure digital (SD) card, and a flash card provided on the computer device. Further, the non-transitory computer-readable storage medium may also include both an internal storage unit and an external storage device of the computer device. The non-transitory computer-readable storage medium is used for storing the computer program and other programs and data needed by the computer device. The non-transitory computer-readable storage medium may also be used for temporarily storing data that has been or will be outputted.

Examples of the present subject matter also provide a computer program product or computer program including computer instructions, the computer instructions are stored in the non-transitory computer-readable storage medium. A processor of the computer device reads the computer instructions from the non-transitory computer-readable storage medium, and the processor executes the computer instructions to cause the computer device to perform the description of the blockchain-based data processing method in the examples corresponding to the above-mentioned FIG. 3, FIG. 9, and FIG. 10 above, and will not be described in detail here. In addition, the description of beneficial effects of the same method are not described herein again.

The terms "first", "second", and the like in the description, claims, and drawings of examples of the present subject matter are used for distinguishing different objects and not for describing a particular order. Furthermore, the term "comprise" and any variations thereof are intended to cover a non-exclusive inclusion. For example, a process, method, apparatus, product, or device that contains a list of steps or units is not limited to the listed steps or modules, but may alternatively include steps or modules not listed or may alternatively include other step units inherent to the process, method, apparatus, product, or device.

A person skilled in the art appreciates that the illustrative units and algorithm steps described in combination with the examples disclosed herein may be implemented by electronic hardware, computer software, or a combination thereof. In order to clearly illustrate the interchangeability of hardware and software, the illustrative components and steps have been described above generally according to function. Whether these functions are implemented by hardware or software depends on the particular application and design constraints of the technical solution. A person skilled in the art may implement the described function in different ways for each particular application, but such implementation should not be considered beyond the scope of the present subject matter.

Methods and related apparatus provided by examples of the present subject matter are described referring to method flowcharts and/or schematic structural diagrams provided by examples of the present subject matter, and specifically each of the flows and/or blocks of the method flowcharts and/or schematic structural diagrams, as well as a combination of the flows and/or blocks in the flowcharts and/or the block diagrams may be implemented by the computer program instructions. These computer program instructions may be provided to a processor of a general-purpose computer, a special-purpose computer, an embedded processor, or other programmable data processing devices to produce a machine so that the instructions executed by the processor of the computer or other programmable data processing devices produce an apparatus for implementing the functions specified in one or more flows in the flowcharts and/or one or more blocks in the schematic structural diagrams. These computer program instructions may also be stored in a non-transitory computer-readable memory that can direct the computer or other programmable data processing devices to work in a particular manner so that the instructions stored in the non-transitory computer-readable memory produce an article of manufacture including an instruction apparatus that implements the functions specified in one or more flows in the flowcharts and/or one or more blocks in the schematic structural diagrams. These computer program instructions may also be loaded onto the computer or other programmable data processing devices to cause a series of operation steps to be performed on the computer or other programmable devices to produce processing implemented by the computer so that the instructions executed on the computer or other programmable devices provide steps for implementing the functions specified in one or more flows in the flowcharts and/or one or more blocks in the schematic structural diagrams.

The above disclosure is merely examples of the present subject matter and, of course, cannot be used for limiting the scope of the rights of the present subject matter, therefore, equivalent changes made according to the claims of the present subject matter are still within the scope of the present subject matter.

What is claimed is:

1. A blockchain-based data processing method performed by a computer device, comprising:
    transmitting a first resource acquisition request of an object identification for a target virtual resource to a blockchain network to make the blockchain network query a target ticket identification associated with the object identification and the target virtual resource based on the first resource acquisition request, wherein the transmitting comprises:
        acquiring a ticket identification to be verified for the target virtual resource in response to a resource acquisition instruction in a digital asset application logged in through the object identification;
        generating the first resource acquisition request according to the ticket identification to be verified and the object identification, and signing the first resource acquisition request to obtain signature information; and
        transmitting the first resource acquisition request carrying the signature information to the blockchain network, wherein
            the signature information is used for indicating validity of the blockchain network verifying the object identification;
            the object identification is used for indicating the blockchain network to acquire a ticket identification set having a binding relationship with the object identification in a case that determining the object identification having a legal permission, wherein
                the ticket identification set comprises the target ticket identification;
            the ticket identification to be verified is used for indicating the blockchain network to determine a holding permission of the object identification for the target virtual resource according to the ticket identification set; and
            the holding permission is used for characterizing that the ticket identification to be verified is the same as the target ticket identification;
    acquiring metadata having a binding relationship with the target ticket identification, the target ticket identification is used for characterizing that the object identification has ownership of the target virtual resource;
    acquiring the target virtual resource according to the metadata returned by the blockchain network; and
    controlling the target virtual resource to perform an interaction output in response to a triggering operation for interacting with the target virtual resource.

2. The method according to claim 1, wherein the acquiring the target virtual resource comprises:
    acquiring the metadata transmitted by the blockchain network in the digital asset application logged in through the object identification;
    parsing the metadata to acquire a storage path corresponding to the target virtual resource, and transmitting a second resource acquisition request to a storage device corresponding to the storage path; and acquiring resource data for the target virtual resource returned by the storage device, and displaying the target virtual resource according to the resource data.

3. The method according to claim 2, wherein the displaying the target virtual resource comprises:
parsing the resource data to acquire resource data to be rendered;
calling a physics engine; and
rendering the resource data to be rendered through a rendering pipeline in the physics engine to obtain the target virtual resource for displaying in a presentation interface.

4. The method according to claim 3, wherein the rendering the resource data comprises:
acquiring a three-dimensional vertex coordinate of a vertex of the target virtual resource in a three-dimensional space in the resource data to be rendered;
acquiring a target projection position;
calling a vertex shader;
mapping the three-dimensional vertex coordinate to a two-dimensional space according to the target projection position to obtain a two-dimensional vertex coordinate of the vertex of the target virtual resource under the target projection position;
drawing a two-dimensional line corresponding to the two-dimensional vertex coordinate and a two-dimensional plane generated by the two-dimensional line in the two-dimensional space according to a connection relationship between vertices of the target virtual resource; and
displaying the target virtual resource under the target projection position in the presentation interface according to the two-dimensional line and the two-dimensional plane.

5. The method according to claim 4, wherein
data to be rendered comprises a target color corresponding to the target virtual resource; and
the displaying the target virtual resource comprises:
determining a geometric primitive of the target virtual resource in the two-dimensional space according to the two-dimensional line and the two-dimensional plane;
rasterizing the geometric primitive to acquire a fragment to be shaded comprising the target virtual resource displayed in the target projection position; and
rendering the target virtual resource in the fragment to be shaded through a fragment shader, and displaying the target virtual resource having the target color in the presentation interface based on a rendering result.

6. The method according to claim 1, wherein the controlling the target virtual resource comprises:
acquiring interaction input data in a digital asset application logged in through the object identification in response to the triggering operation for interacting with the target virtual resource;
determining an interaction type corresponding to the interaction input data through an interaction distribution component, and synchronizing the interaction input data to a data processing component corresponding to the interaction type;
performing interaction logic in the data processing component according to the interaction input data to obtain interaction output data; and
outputting the interaction output data in the target virtual resource.

7. The method according to claim 1, wherein the controlling the target virtual resource comprises:
acquiring angular motion data through an angular motion detection component in a digital asset application logged in through the object identification in response to a triggering operation for performing motion interaction with the target virtual resource;
synchronizing the angular motion data to an interaction distribution component;
determining, in the interaction distribution component, that an interaction type corresponding to the angular motion data is a motion interaction type, and synchronizing the angular motion data to a physics engine component corresponding to the motion interaction type; and
outputting a motion trajectory of the target virtual resource in the physics engine component according to the angular motion data.

8. The method according to claim 1, wherein the controlling the target virtual resource comprises:
acquiring multimedia input data through a multimedia collection component in a digital asset application logged in through the object identification in response to a triggering operation for performing multimedia interaction with the target virtual resource;
determining, through an interaction distribution component, that an interaction type corresponding to the multimedia input data is a multimedia interaction type;
synchronizing the multimedia input data to a multimedia control component corresponding to the multimedia interaction type;
determining multimedia output data corresponding to the multimedia input data through the multimedia control component; and
playing the multimedia output data in the target virtual resource.

9. The method according to claim 1, further comprising:
creating the target virtual resource;
generating the metadata corresponding to the target virtual resource;
generating a resource abstract corresponding to the target virtual resource;
generating a resource issue request according to the metadata, the resource abstract, and the object identification;
transmitting the resource issue request to the blockchain network to make the blockchain network perform a consensus on the resource issue request;
creating the target ticket identification having a binding relationship with the resource issue request in a case that the consensus passes; and
acquiring the target ticket identification issued to the object identification returned by the blockchain network.

10. The method according to claim 9, wherein the generating the metadata comprises:
acquiring a name corresponding to the target virtual resource, a description text corresponding to the target virtual resource, and X pieces of property information corresponding to the target virtual resource, wherein X is a positive integer;
generating resource basic information corresponding to the target virtual resource according to the name, the description text, and the X pieces of property information;

transmitting a resource storage request carrying the target virtual resource to a storage device to make the storage device write the target virtual resource;

acquiring a storage path for the target virtual resource returned by the storage device; and generating the metadata according to the storage path and the resource basic information.

11. A blockchain-based data processing method performed by a computer device, comprising:

a terminal device displaying a target virtual resource in a digital asset application logged in through an object identification according to resource data for the target virtual resource, wherein the displaying the target virtual resource according to the resource data comprises rendering the resource data by:

acquiring a three-dimensional vertex coordinate of a vertex of the target virtual resource in a three-dimensional space in the resource data to be rendered;

acquiring a target projection position;

calling a vertex shader;

mapping the three-dimensional vertex coordinate to a two-dimensional space according to the target projection position to obtain a two-dimensional vertex coordinate of the vertex of the target virtual resource under the target projection position;

drawing a two-dimensional line corresponding to the two-dimensional vertex coordinate and a two-dimensional plane generated by the two-dimensional line in the two-dimensional space according to a connection relationship between vertices of the target virtual resource; and displaying the target virtual resource under the target projection position in the presentation interface according to the two-dimensional line and the two-dimensional plane, wherein the target virtual resource is obtained according to metadata returned by a blockchain network, the metadata is acquired by the terminal device transmitting a first resource acquisition request for the target virtual resource to the blockchain network through the object identification, the first resource acquisition request is used for:
indicating the blockchain network,
querying a target ticket identification associated with the object identification and the target virtual resource, and
acquiring the metadata having a binding relationship with the target ticket identification; and
the target ticket identification is used for characterizing that the object identification has ownership of the target virtual resource; and controlling the target virtual resource to perform an interaction output in response to a triggering operation for interacting with the target virtual resource.

12. The method according to claim 11, wherein
the target virtual resource comprises a three-dimensional model; and
the controlling the target virtual comprises:
acquiring a rotation indication direction in response to a triggering operation for rotating the three-dimensional model;
controlling the three-dimensional model to rotate according to the rotation indication direction;
acquiring a scaling ratio in response to a triggering operation for scaling the three-dimensional model; and controlling the three-dimensional model to scale according to the scaling ratio.

13. The method according to claim 11, wherein
the target virtual resource comprises a virtual role and Y direction controls having a binding relationship with the virtual role,
the Y direction controls comprise a target direction control, and
Y is a positive integer; and
the controlling the target virtual resource comprises:
outputting a motion trajectory to be confirmed for the virtual role in response to a triggering operation for activating a target area, wherein
the motion trajectory to be confirmed is generated based on the target area and an initial area for displaying the virtual role, and
the target area referring to an area other than the initial area in an interface for presenting the target virtual resource;
controlling the virtual role to move according to a confirmed motion trajectory in response to a triggering operation for confirming the motion trajectory to be confirmed; and
controlling the virtual role to move according to a direction indicated by the target direction control in response to a triggering operation on the target direction control.

14. The method according to claim 11, wherein
the target virtual resource comprises a virtual role; and
the controlling the target virtual resource comprises:
updating an interaction suspended state of the virtual role to an interaction activated state in response to a triggering operation for activating the virtual role; and
controlling the virtual role to output feedback audio data during audio interaction in the interaction activated state in response to a triggering operation for performing the audio interaction with the virtual role.

15. The method according to claim 14, wherein the controlling the virtual role comprises:
acquiring audio input data inputted for the virtual role in response to the triggering operation for performing the audio interaction with the virtual role;
acquiring position information and environment information;
inputting both the position information and the environment information into audio interaction logic;
determining feedback audio data associated with the position information and the environment information through the audio interaction logic; and
controlling the virtual role to play the feedback audio data.

16. The method according to claim 11, wherein
the target virtual resource comprises Z audio data playing controls,
the Z audio data playing controls comprise a first audio data playing control and a second audio data playing control, and
Z is a positive integer greater than 1; and
the controlling the target virtual resource comprises:
acquiring first audio data corresponding to the first audio data playing control in response to a triggering operation on the first audio data playing control at a first moment;
acquiring second audio data corresponding to the second audio data playing control in response to a triggering operation on the second audio data playing control at a second moment, wherein
the second moment is later than the first moment, and a time interval between the second moment and the first moment is less than a duration threshold; and
controlling the target virtual resource to play the first audio data and the second audio data in sequence in a case that there is no response to a triggering operation on the Z audio data playing controls at a third moment, wherein
the third moment is later than the second moment, and
a time interval between the third moment and the second moment is greater than or equal to the duration threshold.

17. A blockchain-based data processing apparatus, comprising:
a memory storing a plurality of instructions; and
a processor configured to execute the plurality of instructions, wherein upon execution of the plurality of instructions, the processor is configured to:
transmit a first resource acquisition request of an object identification for a target virtual resource to a blockchain network to make the blockchain network query a target ticket identification associated with the object identification and the target virtual resource based on the first resource acquisition request, wherein in order to transmit the first resource acquisition request, the processor is configured to:
acquire a ticket identification to be verified for the target virtual resource in response to a resource acquisition instruction in a digital asset application logged in through the object identification;
generate the first resource acquisition request according to the ticket identification to be verified and the object identification, and signing the first resource acquisition request to obtain signature information; and
transmit the first resource acquisition request carrying the signature information to the blockchain network, wherein
the signature information is used for indicating validity of the blockchain network verifying the object identification;
the object identification is used for indicating the blockchain network to acquire a ticket identification set having a binding relationship with the object identification in a case that determining the object identification having a legal permission, wherein
the ticket identification set comprises the target ticket identification;
the ticket identification to be verified is used for indicating the blockchain network to determine a holding permission of the object identification for the target virtual resource according to the ticket identification set; and
the holding permission is used for characterizing that the ticket identification to be verified is the same as the target ticket identification;
acquire metadata having a binding relationship with the target ticket identification, the target ticket identification is used for characterizing that the object identification has ownership of the target virtual resource;
acquire the target virtual resource according to the metadata returned by the blockchain network; and control the target virtual resource to perform an interaction output in response to a triggering operation for interacting with the target virtual resource.

18. A blockchain-based data processing apparatus, the blockchain-based data processing apparatus running on a terminal device, comprising:
a memory storing a plurality of instructions; and
a processor configured to execute the plurality of instructions, wherein upon execution of the plurality of instructions, the processor is configured to cause a resource display to display a target virtual resource in a digital asset application logged in through an object identification according to resource data for the target virtual resource, wherein the processor is configured to render the resource data to displaying the target virtual resource according to the resource data, and in order to render the resource data, the processor is configured to:
acquire a three-dimensional vertex coordinate of a vertex of the target virtual resource in a three-dimensional space in the resource data to be rendered;
acquire a target projection position;
call a vertex shader;
map the three-dimensional vertex coordinate to a two-dimensional space according to the target projection position to obtain a two-dimensional vertex coordinate of the vertex of the target virtual resource under the target projection position;
draw a two-dimensional line corresponding to the two-dimensional vertex coordinate and a two-dimensional plane generated by the two-dimensional line in the two-dimensional space according to a connection relationship between vertices of the target virtual resource; and
display, via the resource display, the target virtual resource under the target projection position in the presentation interface according to the two-dimensional line and the two-dimensional plane,
wherein
the target virtual resource is obtained according to metadata returned by a blockchain network,
the metadata is acquired by a terminal device transmitting a first resource acquisition request for the target virtual resource to the blockchain network through the object identification,
the first resource acquisition request is used for:
indicating the blockchain network,
querying a target ticket identification associated with the object identification and the target virtual resource, and
acquiring the metadata having a binding relationship with the target ticket identification; and the target ticket identification is used for characterizing that the object identification has ownership of the target virtual resource; and
an interaction output module configured to control the target virtual resource to perform an interaction output in response to a triggering operation for interacting with the target virtual resource.

19. A computer device, comprising:
a processor,
a memory, and
a network interface, wherein
the processor is connected to the memory and the network interface,
the network interface is configured to provide a data communication function, the memory is configured to store a computer program, and the processor is configured to call the computer program to cause the computer device to perform the method according to claim 1.

20. A non-transitory computer-readable storage medium having stored therein a computer program, the computer program is adapted to be loaded and executed by a processor to cause a computer device having the processor to perform the method according to claim 1.

* * * * *